United States Patent
Lemens et al.

(10) Patent No.: US 6,742,428 B2
(45) Date of Patent: Jun. 1, 2004

(54) CUTTER ASSEMBLY FOR A MASTER PROCESSING APPARATUS

(75) Inventors: Paul J. Lemens, Scottsdale, AZ (US); Joseph E. Velasquez, Gilbert, AZ (US); Daniel G. Reed, Mesa, AZ (US)

(73) Assignee: Xyron, Inc., Scottsdale, AZ (US)

(*) Notice: Subject to any disclaimer, the term of this patent is extended or adjusted under 35 U.S.C. 154(b) by 93 days.

(21) Appl. No.: 10/193,192

(22) Filed: Jul. 12, 2002

(65) Prior Publication Data

US 2003/0010170 A1 Jan. 16, 2003

Related U.S. Application Data

(60) Provisional application No. 60/304,747, filed on Jul. 13, 2001.

(51) Int. Cl.[7] ............................................... B26D 5/20
(52) U.S. Cl. ............................. 83/353; 83/614; 156/555; 100/327
(58) Field of Search ..................... 83/353, 614, 613, 83/57; 154/64; 156/380.7, 409, 419, 469, 363, 555, 579, 582; 100/327, 155 R, 176

(56) References Cited

U.S. PATENT DOCUMENTS

| 228,686 A | 6/1880 | Smith |
|---|---|---|
| 231,857 A | 8/1880 | Smith |
| 1,434,475 A | 11/1922 | Austin |
| 2,013,893 A | 9/1935 | Matthews |
| 3,237,497 A | 3/1966 | Cook |
| 3,301,117 A | 1/1967 | Spaulding |
| 3,385,149 A | 5/1968 | Johnson |
| 3,532,018 A | 10/1970 | Szabo |
| 3,779,119 A | 12/1973 | Broides |
| 4,038,751 A | 8/1977 | Albright |
| 4,967,628 A | 11/1990 | Judd et al. |
| 5,069,097 A | 12/1991 | Mori |
| 5,103,710 A | 4/1992 | Ross |

(List continued on next page.)

FOREIGN PATENT DOCUMENTS

| EP | 60040272 | 2/1985 |
|---|---|---|
| JP | 60-40272 | 3/1985 |
| JP | 11-245296 | 9/1999 |
| JP | 11-245297 | 9/1999 |
| JP | 11-245299 | 9/1999 |
| JP | 11-254528 | 9/1999 |
| JP | 11-278416 | 10/1999 |
| JP | 2000-37775 | 2/2000 |
| JP | 2000-168020 | 6/2000 |
| JP | 2000-272005 | 10/2000 |
| JP | 2001-79940 | 3/2001 |
| JP | 2001-79942 | 3/2001 |
| JP | 2001-79943 | 3/2001 |
| JP | 2001-79946 | 3/2001 |
| JP | 2001-96617 | 4/2001 |
| JP | 2001-96619 | 4/2001 |
| JP | 2001-277357 | 10/2001 |
| WO | WO 99/24257 | 5/1999 |

*Primary Examiner*—Allan N. Shoap
*Assistant Examiner*—Phong Nguyen
(74) *Attorney, Agent, or Firm*—Pillsbury Winthrop LLP

(57) ABSTRACT

A master processing apparatus for use with a pair of removable feed rolls includes a frame, a master processing assembly, and a cutter assembly. The processing assembly performs a master processing operation wherein adhesive bonding is caused between a master and stock materials of the feed rolls. The cutter assembly is removably mounted to the frame on the discharge side of processing assembly. The cutter assembly has a blade movable to perform a severing operation wherein the blade cuts through the stock materials discharged from the processing assembly in a direction generally transverse to the feeding direction to sever a final product including the processed master and stock materials from a remainder of the supply of stock materials. The cutter assembly is removable from the frame for placement on a support surface to perform other cutting operations including a trimming operation wherein the blade is moved in the feeding direction.

33 Claims, 14 Drawing Sheets

U.S. PATENT DOCUMENTS

| | | | |
|---|---|---|---|
| 5,287,783 A | 2/1994 | Mori | |
| 5,322,001 A | 6/1994 | Boda | |
| 5,365,820 A | 11/1994 | Mori | |
| 5,524,515 A | 6/1996 | Boda | |
| 5,537,904 A | 7/1996 | Albin | |
| 5,580,417 A | 12/1996 | Bradshaw | |
| 5,584,962 A | 12/1996 | Bradshaw et al. | |
| 5,671,647 A | 9/1997 | Mori | |
| 5,888,342 A * | 3/1999 | Reinders | 156/494 |
| 5,961,779 A * | 10/1999 | Bradshaw | 156/495 |
| 5,996,459 A * | 12/1999 | Cornell et al. | 83/485 |
| 6,079,307 A | 6/2000 | Mori | |
| 6,098,515 A | 8/2000 | Daley, Jr. | |
| 6,138,546 A | 10/2000 | Hursey | |
| 6,244,322 B1 | 6/2001 | Paque | |
| 6,315,020 B1 * | 11/2001 | Seki | 156/351 |
| 6,422,281 B1 * | 7/2002 | Ensign et al. | 156/495 |
| 6,427,744 B2 | 8/2002 | Seki et al. | |
| 6,431,243 B1 | 8/2002 | Ito et al. | |
| 6,431,244 B1 * | 8/2002 | Moriguchi et al. | 156/555 |
| 6,523,592 B2 * | 2/2003 | Kuki | 156/353 |
| 6,550,516 B2 | 4/2003 | Moriguchi et al. | |
| 6,578,618 B2 | 6/2003 | Ito et al. | |
| 2001/0004922 A1 * | 6/2001 | Seki et al. | 156/363 |
| 2001/0049989 A1 * | 12/2001 | Takeuchi | 83/614 |

\* cited by examiner

CUTTER ASSEMBLY FOR A MASTER PROCESSING APPARATUS

The present application claims priority to U.S. Provisional Application of Paul Lemens et al., Application No. 60/304,747, filed Jul. 13, 2001, the entirety of which is hereby incorporated into the present application by reference.

FIELD OF THE INVENTION

The present invention relates to a master processing apparatus for performing a master processing operation on a selected substrate.

BACKGROUND OF THE INVENTION

Master processing apparatuses, such as laminating apparatuses and adhesive transfer apparatuses, are well-known in the art. These apparatuses typically include a frame to which a pair of feed rolls are removably mounted (either individually or in a cartridge). A master processing assembly is provided in the frame and the stock materials on the feed roll are unwound and fed into the processing assembly. A power or hand-operated actuator actuates the processing assembly. A master (such as a photograph, printout, business card or any other selected substrate or document) to be processed is fed into the processing assembly and the processing assembly causes adhesive from one or both the stock materials to bond to the master. In laminating operations, both stock materials are laminating films coated with pressure-sensitive or heat-sensitive adhesive and these films are both adhered to the opposing sides of the master. In adhesive transfer operations, one of the stock materials is a release liner on which a layer of adhesive is coated and the other is an aggressive or non-aggressive mask. During the operation, the adhesive on the release liner is transferred to one side of the master and, if the mask substrate is aggressive (i.e. has an affinity for adhesive bonding), then any excess adhesive will transfer to the mask substrate, which is then peeled off to expose the master on the release liner and remove the excess adhesive. For further details on these operations, reference may be made to U.S. Pat. Nos. 5,580,417 and 5,584,962.

In known apparatuses, a cutting device is mounted adjacent the discharge side of the master processing assembly in order to sever a final product containing a master from the continuous strips of stock material (see U.S. Pat. No. 6,244, 322). The cutting device is operable to perform a cutting operation after a master processing operation wherein the cutting device cuts through the stock materials in a direction transverse to the feeding direction. The cutting device is not adapted to perform additional cutting operations in different directions, such as the feeding direction, before or after master processing operations. Typically, if the operator needs to perform additional cutting operations, the user must use an additional cutting device separate from the apparatus. Thus, it would be desirable to provide a cutting device for a master processing apparatus that can perform multiple cutting operations before or after master processing operations so as to facilitate the entire procedure associated with master processing operations.

Additionally, known apparatuses do not provide any storage features for parts useful in processing operations, such as replacement blades for the cutting device. It would be desirable to provide a suitable storage space on an apparatus to accommodate the storage of such parts.

SUMMARY OF THE INVENTION

One aspect of the present invention provides a master processing apparatus for use with a pair of removable feed rolls. The removable feed rolls carry a supply of stock material to be unwound and at least one of the stock materials has a layer of adhesive provided thereon. The apparatus includes a frame, a master processing assembly, and a cutter assembly. The frame is constructed and arranged to removably mount the feed rolls. The master processing assembly is constructed and arranged such that, when the feed rolls are removably mounted to the frame, a master can be inserted into the master processing assembly together with the stock materials unwound from their respective feed rolls and disposed on opposing sides of the master. The master processing assembly is constructed and arranged to perform a master processing operation wherein the master processing assembly causes adhesive bonding between the master and the stock materials being fed in a feeding direction into the feed side thereof and subsequently discharges the processed master and stock materials outwardly from a discharge side thereof. The cutter assembly is removably mounted in a mounted operative position to the frame on the discharge side of the master processing assembly. The cutter assembly has a blade movable to perform a cutting operation in the form of a severing operation. In the cutting or severing operation, the blade cuts through the stock materials discharged from the processing assembly in a direction generally transverse to the feeding direction to sever a final product comprising the processed master and stock materials from a remainder of the supply of the stock materials. The cutter assembly is constructed and arranged to be removed from the frame for placement in a removed operative position on a generally horizontal surface separate from the frame. The cutter assembly is constructed and arranged such that, in the removed operative position, the blade is movable to perform other cutting operations including a trimming operation wherein the blade is moved to cut through the processed stock materials in the feeding direction.

Another aspect of the present invention provides a master processing system including a frame, first and second feed rolls, a master processing assembly, and a cutter assembly. The first and second feed rolls carry respective supplies of first and second stock material. The feed rolls are mounted to the frame to enable the stock materials to be unwound from their respective feed rolls, at least one of the stock materials having a layer of adhesive disposed thereon. The master processing assembly is constructed and arranged such that a master can be inserted into the master processing assembly together with the stock materials unwound from their respective feed rolls and disposed on opposing sides of the master. The master processing assembly is constructed and arranged to perform a master processing operation wherein the master processing assembly causes adhesive bonding between the master and the stock materials being fed into the feed side thereof and subsequently discharges the processed master and stock materials outwardly from a discharge side thereof. The cutter assembly is removably mounted in a mounted operative position to the frame on the discharge side of the master processing assembly. The cutter assembly has a blade movable to perform a cutting operation in the form of a severing operation wherein the blade cuts through the stock materials discharged from the processing assembly in a direction generally transverse to the feeding direction to sever a final product comprising the processed master and stock materials from a remainder of the supply of the stock materials. The cutter assembly is constructed and arranged to be removed from the frame for placement in a removed operative position on a generally horizontal surface separate from the frame. The cutter assembly is constructed and arranged such that the blade is movable to perform other cutting operations including a trimming operation wherein the blade is moved to cut through the processed stock materials in the feeding direction.

Another aspect of the invention relates to an improved arrangement for mounting a blade carriage of a cutting assembly to a guide member. This aspect of the invention may be used in any type of arrangement and is not limited to the removable type of cutter assembly discussed above. In this aspect of the invention, the guide member has a removable portion that is removable to create an open space in the guide member. The open space is configured to enable the blade carriage to be (a) removed by transversely moving the carriage into the open space for disengagement of the carriage from the guide member, and (b) installed by disposing the blade carriage within the open space and moving the blade carriage transversely onto the guide member.

Still another aspect of the invention relates to a master processing apparatus for use with a pair of removable feed rolls. The removable feed rolls carry a supply of stock material to be unwound, at least one of the stock materials having a layer of adhesive provided thereon. The apparatus includes a frame constructed and arranged to removably mount the feed rolls and a master processing assembly constructed and arranged such that, when the feed rolls are removably mounted to the frame, a master can be inserted into the master processing assembly together with the stock materials unwound from their respective feed rolls and disposed on opposing sides of the master. The master processing assembly is constructed and arranged to perform a master processing operation wherein the master processing assembly causes adhesive bonding between the master and the stock materials being fed in a feeding direction into a feed side thereof and subsequently discharges the processed master and stock materials outwardly from a discharge side thereof. A support structure is removably mounted in a mounted operative position to the frame on one of the feed side and the discharge side of the master processing assembly. The support structure has a substrate supporting surface configured to receive and support the processed master and stock materials being fed through the master processing assembly in a substantially flat relation. The frame includes a storage compartment on the same side of the master processing assembly as the support structure in its mounted operative position. The storage compartment has an upwardly facing opening and is configured to store objects therein. The support structure is positioned in covering relation to the upwardly facing opening of the storage compartment when the support structure is removably mounted in the mounted operative position to the frame. The support structure is constructed and arranged to be removed from the frame to enable access to the storage compartment of the frame through the upwardly facing opening thereof.

Other objects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF PREFERRED EMBODIMENTS

FIGS. 1–4 show one embodiment of a master processing apparatus 10 constructed in accordance with the principles of the present invention. As explained below, the master processing apparatus 10 is constructed for use with a pair of removable feed rolls, each of which carries a supply of stock material that is wound around a central core. The stock materials can be, for example, a pair of transparent laminating films that are applied to opposing sides of a document, photograph or other master to be protected. The stock materials may be designed for adhesive transfer with one of the stock materials being a release liner coated with a pressure-sensitive adhesive and the other stock material being an adhesive mask substrate (see U.S. Pat. Nos. 5,580, 417 and 5,584,962 and U.S. Appln. of Ensign, Jr., Ser. No. 09/564,587, filed May 5, 2000). Other variations of master processing operations may be performed with the apparatus 10. For example, the stock materials may include a magnetized substrate and an aggressive or non-aggressive adhesive mask (see U.S. Patent Appln. 2001/0042590). All the patents and patent applications mentioned hereinabove are hereby incorporated into the present application by reference. Regardless of the specific type of application, the apparatus 10 is operable to unwind the supply of stock material on each roll and apply the stock material to respective sides of the master. At least one of the stock materials has a layer of adhesive thereon which adheres the stock materials to one another and the master therebetween.

Figure 1:
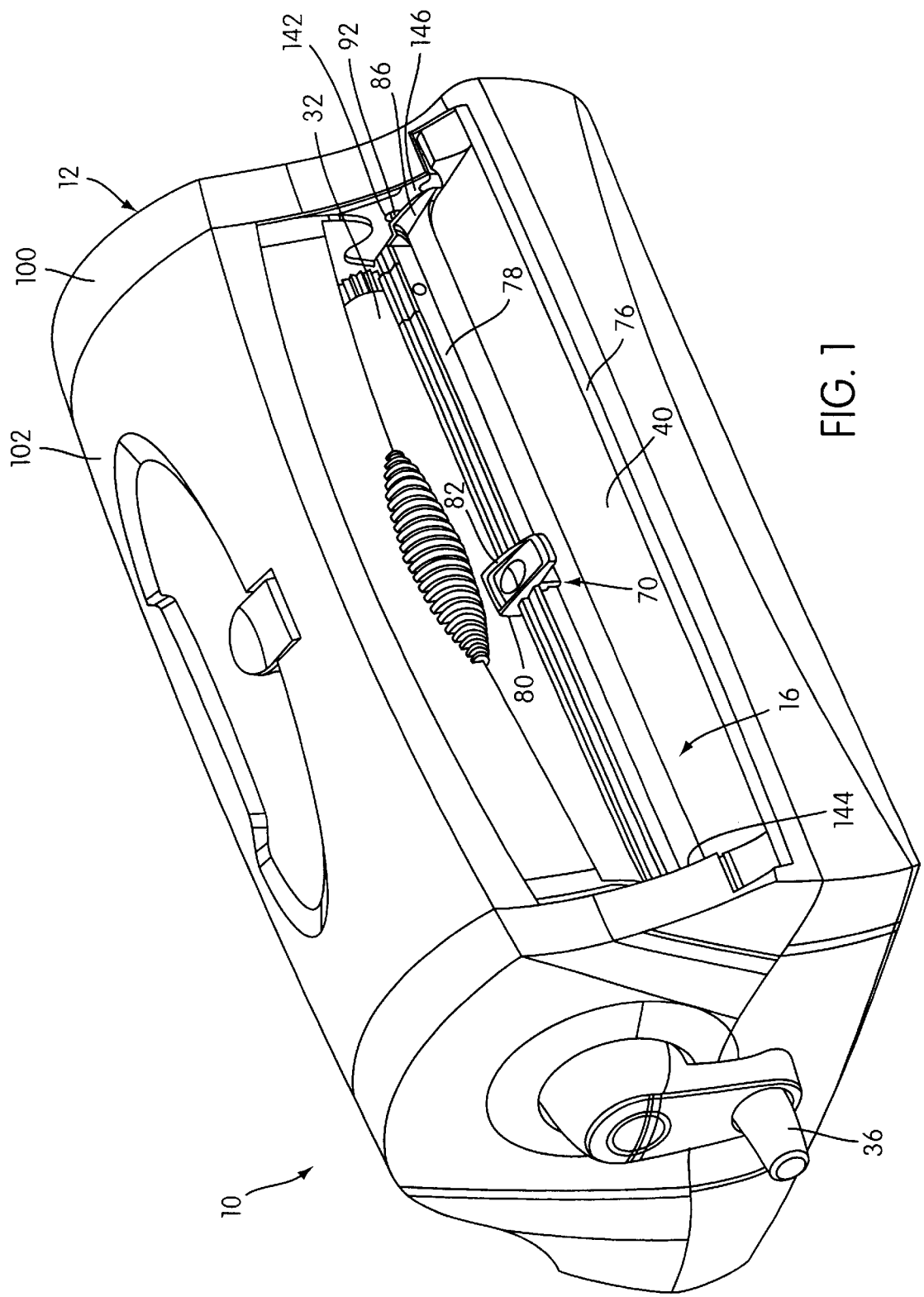
FIG. 1 is a perspective view of one embodiment of a master processing apparatus constructed according to the principles of the present invention showing the cutter assembly removably mounted to the frame.
Figure 2:
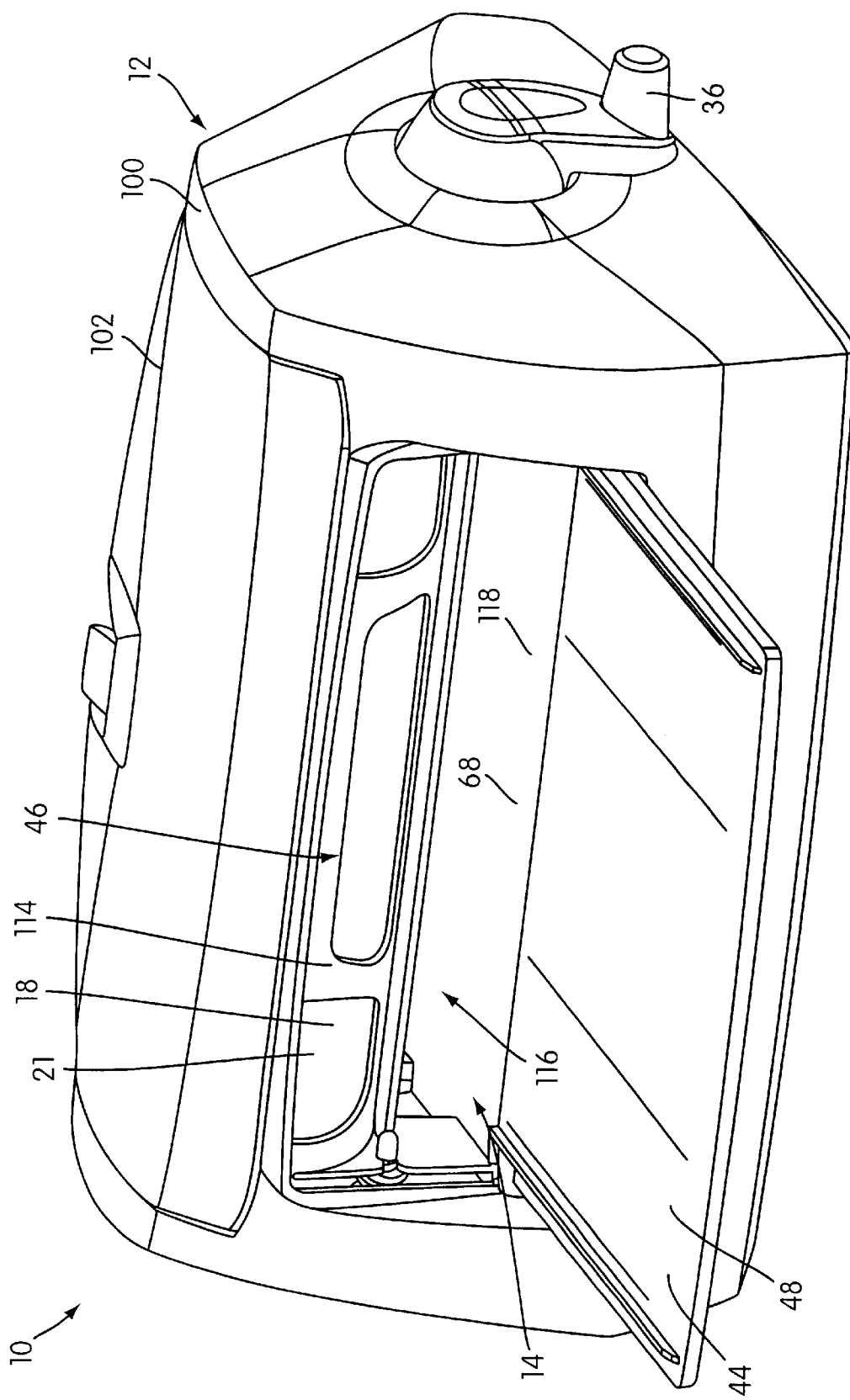
FIG. 2 is a perspective view of the master processing apparatus of FIG. 1 showing the feed side thereof.
Figure 3:
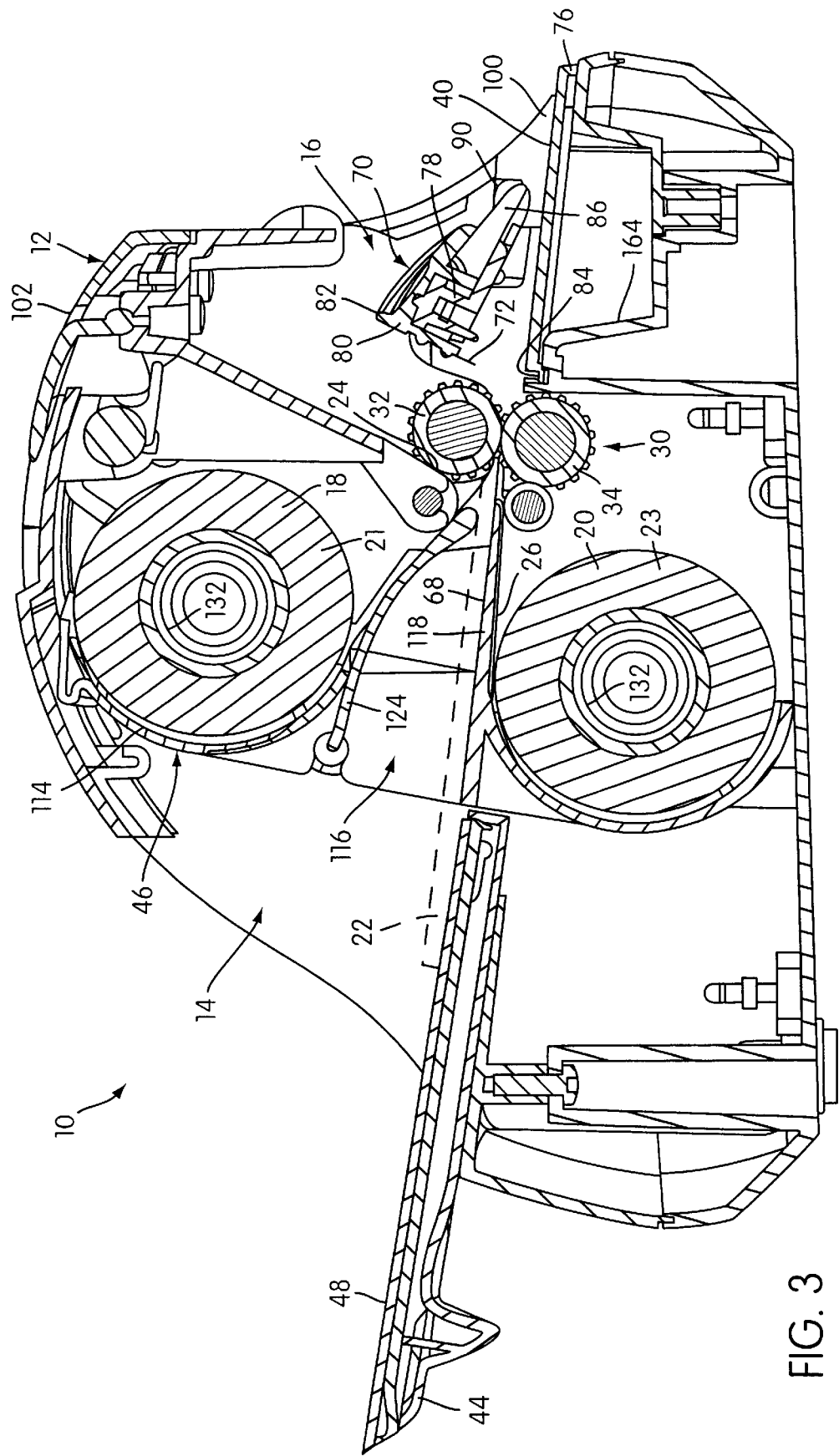
FIG. 3 is a cross-sectional view of the master processing apparatus of FIG. 1.

The structure of the master processing apparatus 10 can be best understood from FIGS. 1–3. The master processing apparatus 10 includes a frame 12 that has a feed opening 14 (see FIGS. 2 and 3, for example) and an exit or discharge opening 16 (see FIGS. 1 and 3, for example). The internal structure of the master processing apparatus 10 can be understood from the cross section of FIG. 3. The master processing apparatus 10 is constructed and arranged to removably mount feed rolls 18, 20. In the illustrated embodiment, the feed rolls 18, 20 are mounted in the body structure of a cartridge 46 that is removably mounted in the frame 12. However, the frame 12 may be constructed and arranged to removably mount the feed rolls individually without the use of a cartridge. Each roll 18, 20 has a supply of a wound stock material or substrate 21, 23, respectively. To better appreciate the discussion of the structure of the apparatus 10, its operation will be briefly considered first with particular reference to FIG. 3.

Generally, a master 22 (shown in dashed lines and with exaggerated thickness in FIG. 3) is inserted into the feed opening 14, and then the master 22 along with unwound portions 24, 26 of stock material 21, 23 from the upper and lower rolls 18, 20, respectively, are passed through a master processing assembly 30. The master processing assembly 30 includes a pair of cooperating pressure applying structures in the form of first and second nip rollers 32, 34, respectively.

The nip rollers 32, 34 are rotatably mounted within the frame 12. In the illustrated embodiment, an actuator, which may be in the form of a crank handle 36 as shown in FIGS. 1 and 2, is operatively connected with the nip rollers 32, 34 to affect operation thereof. Alternatively, the actuator may be power-driven by a motor. It is also contemplated that an actuator may not be provided and the master 22 is instead inserted and pulled through the master processing assembly 30 manually. The master 22 is inserted into the master processing assembly 30 together with the stock materials 21, 23 unwound from their respective feed rolls 18, 20 and disposed on opposing sides of the master 22. At least one of the stock materials is covered with a layer of a pressure-sensitive adhesive. As the master 22 and the two layers of unwound stock material 21, 23 pass between the nip rollers 32, 34, the nip rollers perform a master processing operation. The nip rollers 32, 34 apply pressure to the stock materials (and to the master 22 when it is between the nip rollers 32, 34) during the master processing operation which causes adhesive bonding of each adhesive layer provided by the stock materials which bonds the master 22 and the stock materials 24, 26 to form a final product of the master 22 and the stock materials 24, 26. The final product is discharged out the discharge opening 16 by the driving action of the nip rollers 32, 34. The final product is supported at the discharge opening 16 by a substrate supporting surface 40. The substrate supporting surface 40 is configured to receive and support the processed master and stock materials discharged from the processing assembly in a substantially flat condition.

A feed tray 44 having a substrate supporting surface 48 is movably mounted to the frame 12 on the feed side of the master processing assembly 30. Preferably, the tray 44 and the frame 12 are molded plastic structures, although any suitable construction or material can be used.

Generally, the tray 44 is mounted on the frame 12 for selective movement between (a) an operative position (as shown in FIGS. 2–3) and (b) an inoperative position. When the tray 44 is in its operative position, it extends outwardly from the master processing assembly 30 and the substrate supporting surface 48 on the tray 44 is positioned to support a master 22 in a substantially flat condition as the master 22 is being fed into the master processing assembly 30. When the tray 44 is in its inoperative position, it is positioned in covering relation to the feed opening 14 of the frame 12 to inhibit ingress of undesired objects into the master processing assembly 30 via the feed opening 14. The movable mounting of the tray 44 into the inoperative position is also advantageous because it allows the apparatus 10 to be stored (in a package for shipping prior to sale or at a worksite after sale, for example) in less space.

A cutter assembly 70, as will be further discussed, is removably mounted in a mounted operative position to the frame 12 on the discharge side 16 of the master processing assembly 30 and is operable to sever a final product containing a master 22 from the continuous strips of stock material.

In the illustrated embodiment, the frame 12 includes first and second frame portions 100, 102, which are movably connected for movement relative to one another between closed, as shown in FIGS. 1–3, and open positions. When the second frame portion 102 is in its open position, this allows an old cartridge 46 to be removed when its supply of stock materials is used up and a new cartridge having a fresh supply of stock materials to be placed in the apparatus 10. After a new supply of stock materials is placed in the apparatus 10, the end portions of the stock materials 21, 23 on a respective feed rolls 18, 20 are pulled out from the rolls and positioned between the nip rollers 32, 34. The two frame portions 100, 102 are then moved back into their closed positions.

In the illustrated embodiment, the replaceable feed rolls 18, 20 are mounted within a cartridge to facilitate easy removal and replacement of the feed rolls 18, 20. The cartridge 46 includes a cartridge body structure 114, preferably made of a suitable molded plastic, constructed and arranged to be removably mounted to the apparatus frame 12 and a pair of feed rolls 18, 20 rotatably mounted therein. The feed rolls 18, 20, each carrying a supply of the stock materials 21, 23, are mounted to the cartridge body structure 114 to enable the stock materials 21, 23 to be unwound from their respective feed rolls and placed between the nip rollers 32, 34. Each roll of stock material (or substrate) 18, 20 is comprised of a long, continuous strip of stock material wound around a central tubular core 132. Typically the core 132 is made of heavy cardboard. The core 132 is rotatably mounted in the cartridge body structure 114. The cartridge body structure 114 and the feed rolls 18, 20 are constructed and arranged such that, when the cartridge body structure 114 is removably mounted to the apparatus frame 12, a master 22 can be inserted into an front opening 116 of the cartridge 46 and pass therethrough into the master processing assembly 30 of the apparatus 10 with the first and second stock materials 21, 23 from the respective feed rolls 18, 20 and disposed on opposing sides of the master 22.

The cartridge 46 includes a substrate supporting member 118, which extends between opposing sidewalls of the cartridge 46. The upper surface of the supporting member 118 provides a generally planar substrate supporting surface 68. The substrate supporting surface 68 is generally co-planar with and immediately adjacent to the substrate supporting surface 48 of the feed tray 44 so that together these surfaces 48, 68 continuously support the master from the feed tray 44 to the master processing assembly 30.

The cartridge 46 also includes a master engaging structure 124. The master engaging structure 124 applies a frictional resistance to the advancement of the master 22 in a feeding direction to thereby tension the master to prevent the same from wrinkling, for example, as it goes into the master processing assembly 30. The master engaging structure may also provide the additional, but not necessary, benefit of wiping any particles off the surface of the master 22.

In a broad sense, the cartridge 46 serves to removably mount the feed roll 18, 20 to the apparatus frame 12. Thus, the cartridge 46 may be referred to as a feed roll mounting structure, which is intended to encompass any structural arrangement suitable for mounting and supporting one or more feed rolls on an apparatus frame.

In the illustrated embodiment, to perform a master processing operation, a cartridge 46 is placed inside the frame 12 and the leading portions 24, 26 of the stock materials 21, 23 from the upper and lower feed rolls 18, 20, respectively, are unwound and placed between the nip roller 32, 34.

A document or other master 22 to be covered with stock material is placed on the substrate support surface 48 of the feed tray 44 and pushed through the feed opening 14 in the frame 12 and through the cartridge front opening 116 in the replaceable cartridge 46 until the document 22 comes into contact with the unwound portions 24, 26 of the stock materials 21, 23. At least one of the unwound portions 24, 26 is coated with an adhesive so that the document adheres thereto. The operator then rotates the crank handle 36 which causes the nip rollers 32, 34 of the master processing assembly 30 to rotate so as to drive the master 22 and the stock materials therebetween and outwardly towards the discharge opening 16 in the frame 12. As the stock materials (with or without the master 22 therebetween) pass between the nip rollers 32, 34, the nip rollers apply pressure to the stock materials to activate the pressure sensitive adhesive and adhere the stock materials to opposing sides of the master 22 and/or to one another.

When the entire length of the master 22 has been covered with stock material 21, 23, the final product passes through the discharge opening 16. When the master has cleared the discharge opening 16, the operator stops rotation of the crank handle 36 and uses the cutter assembly 70 to sever the finished product from the continuous strip of stock materials 21, 23.

In an alternative embodiment for laminating apparatuses, the stock materials may be coated with a heat-activated adhesive. In such an apparatus, heating elements would be provided in the master processing assembly 30 upstream of the nip rollers (or other pressure applying structures) to soften or melt the adhesive prior to application of pressure by the nip rollers. For example, a pair of heating platens could be positioned on opposing sides of the stock materials in order to heat the adhesive prior to reaching the nip rollers. Alternatively, heating elements could be provided in the nip rollers themselves so as to simultaneously heat and apply pressure to the stock materials. The master processing assembly used in an apparatus constructed in accordance with this invention may have any suitable construction.

A further understanding of the details of operation and of the components of the master processing apparatus 10 is not necessary in order to understand the principles of the present invention and thus will not be further detailed herein. Further details of operation and of the components of the master processing apparatus 10 are disclosed in U.S. patent application of Lemens et al., Ser. No. 09/987,484, filed Nov. 14, 2001, the entirety of which is hereby incorporated by reference into the present specification. Instead, the present invention is concerned in detail with the cutter assembly 70 of the master processing apparatus 10 and how it is removably mounted to the frame 12 to enable an operator to perform multiple cutting operations.

The cutter assembly 70 is removably mounted in its mounted operative position to the frame 12 on the discharge side of the master processing assembly 30. The cutter assembly 70 has a blade 72 movable to perform a cutting operation in the form of a severing operation wherein the blade 72 cuts through the stock materials 21, 23 discharged from the processing assembly 30 in a direction generally transverse to the feeding direction to sever a final product comprising the processed master 22 and stock materials 21, 23 from a remainder of the supply of the stock materials 21, 23. The cutter assembly 70 is constructed and arranged to be removed from the frame 12 for placement in a removed operative position on a generally horizontal support surface 74 (shown in FIGS. 7 and 8) separate from the frame 12, such as a table or desk. The cutter assembly 70 has a support structure 76 to stably support the cutter assembly 70 on the horizontal support surface 74. When removed from the frame 12, the cutter assembly 70 is constructed and arranged such that the blade 72 is movable to perform other cutting operations including a trimming operation wherein the blade 72 is moved to cut through the processed stock materials 21, 23 in the feeding direction. The cutter assembly 70 may also be used to cut the master 22 before a master processing operation.

In the illustrated embodiment, the cutter assembly 70 includes the support structure 76 in the form of a base member, a guide member 78 movably mounted to the base member 76, and a blade assembly 80.

The base member 76 is removably mounted to the frame 12 such that the base member 76 and hence the guide member 78 mounted thereto extend transversely with respect to the frame 12. The base member 76 provides the substrate supporting surface 40 on an upper surface thereof. The substrate supporting surface 40 is configured to receive and support the processed master 22 and stock materials 21, 23 being discharged from the processing assembly 30 in a substantially flat relation. The substrate supporting surface 40 also supports the master, processed or not, in a substantially flat relation when the cutter assembly 70 is removed from the frame 12.

The blade assembly 80 includes the blade 72 and a blade carriage 82. Preferably, the blade 72 is a pointed, double-sided blade. The blade 72 of the blade assembly 80 is slidably mounted on the guide member 78 for guided cutting movement therealong. Specifically, the blade 72 is mounted to the blade carriage 82 and the blade carriage 82 is slidably mounted on the guide member 78.

Figure 7:
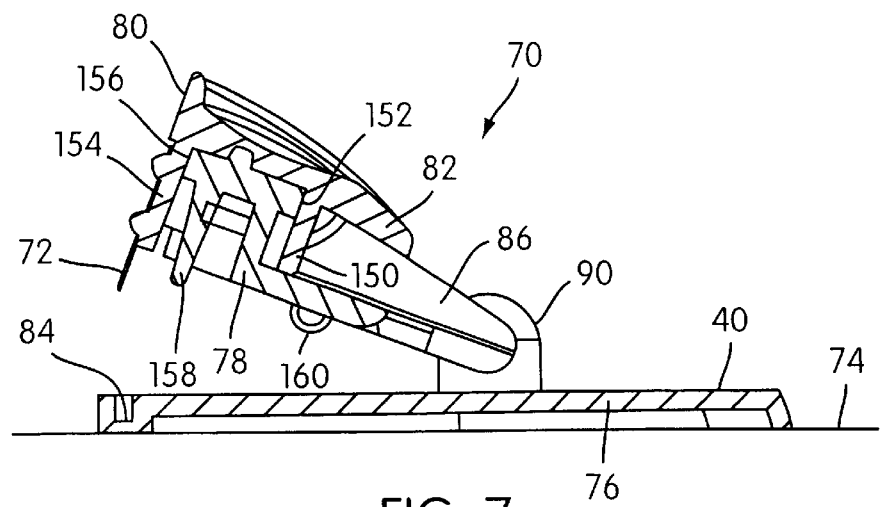
FIG. 7 is a cross-sectional view of the cutter assembly with the guide member in the inoperative position.
Figure 8:
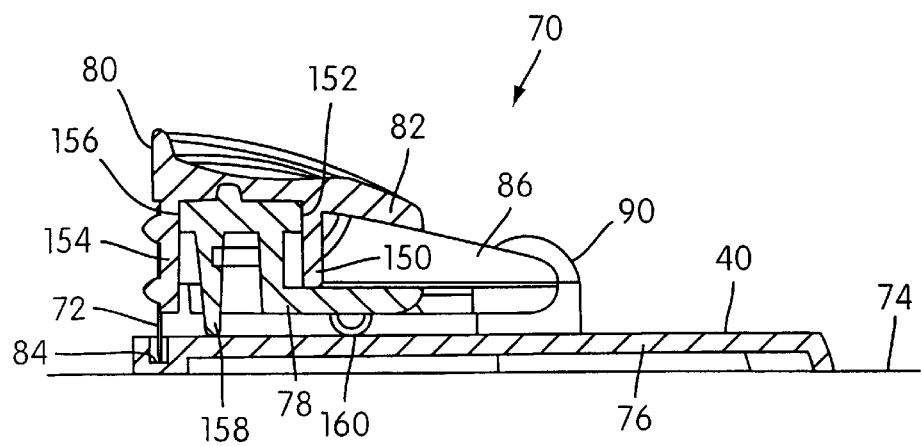
FIG. 8 is a cross-sectional view of the cutter assembly with the guide member in the operative position.

The guide member 78 is movably mounted to the base member 76 for selective manual movement between (a) an inoperative, non-cutting position (as shown in FIG. 7) wherein the blade 72 is positioned in spaced relation above the substrate supporting surface 40 to prevent the blade assembly 80 from cutting through the master 22 (and stock materials 21, 23 if the master 22 is processed) in the event of accidental lateral movement thereof and (b) an operative, cutting position (as shown in FIG. 8) wherein the blade 72 is positioned such that a blade portion thereof extends downwardly below the substrate supporting surface 40 (and into a laterally extending blade receiving slot 84 formed in the base member 76) so that the downward extent of the blade portion enables the blade 72 to cut through an entire thickness of the master 22 (and stock materials 21, 23 if the master 22 is processed) during the cutting movement of the blade assembly 80 with respect to the guide member 78.

Figure 6:
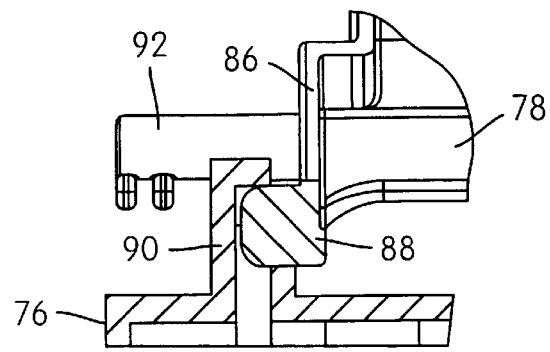
FIG. 6 is a cross-sectional view of the cutter assembly.

In the illustrated embodiment, the guide member 78 has a pair of mounting arms 86 extending from opposing ends thereof. The mounting arms 86 are pivotally connected to the base member 76 to enable the guide member 78 to pivot between its operative and inoperative positions. Specifically, as shown in FIG. 6, the mounting arms 86 have outwardly extending projections 88 that are pivotally connected to mounting structures 90 provided by the base member 76. The guide member 78 also includes cutter guides 92 that guide the movement of the blade 72 when the cutter assembly 70 is removably mounted to the frame 12. Specifically, the cutter guides 92 guide the movement of the blade 72 into the blade slot 84 as the guide member 78 moves from its inoperative position into its operative position in a manner which be described below. The cutter guides 92 in the illustrated embodiment are in the form of a pair of projections formed on a central portion of a respective mounting arm 86. The projections 92 extend laterally outwardly from the mounting arms 86.

Figure 9:
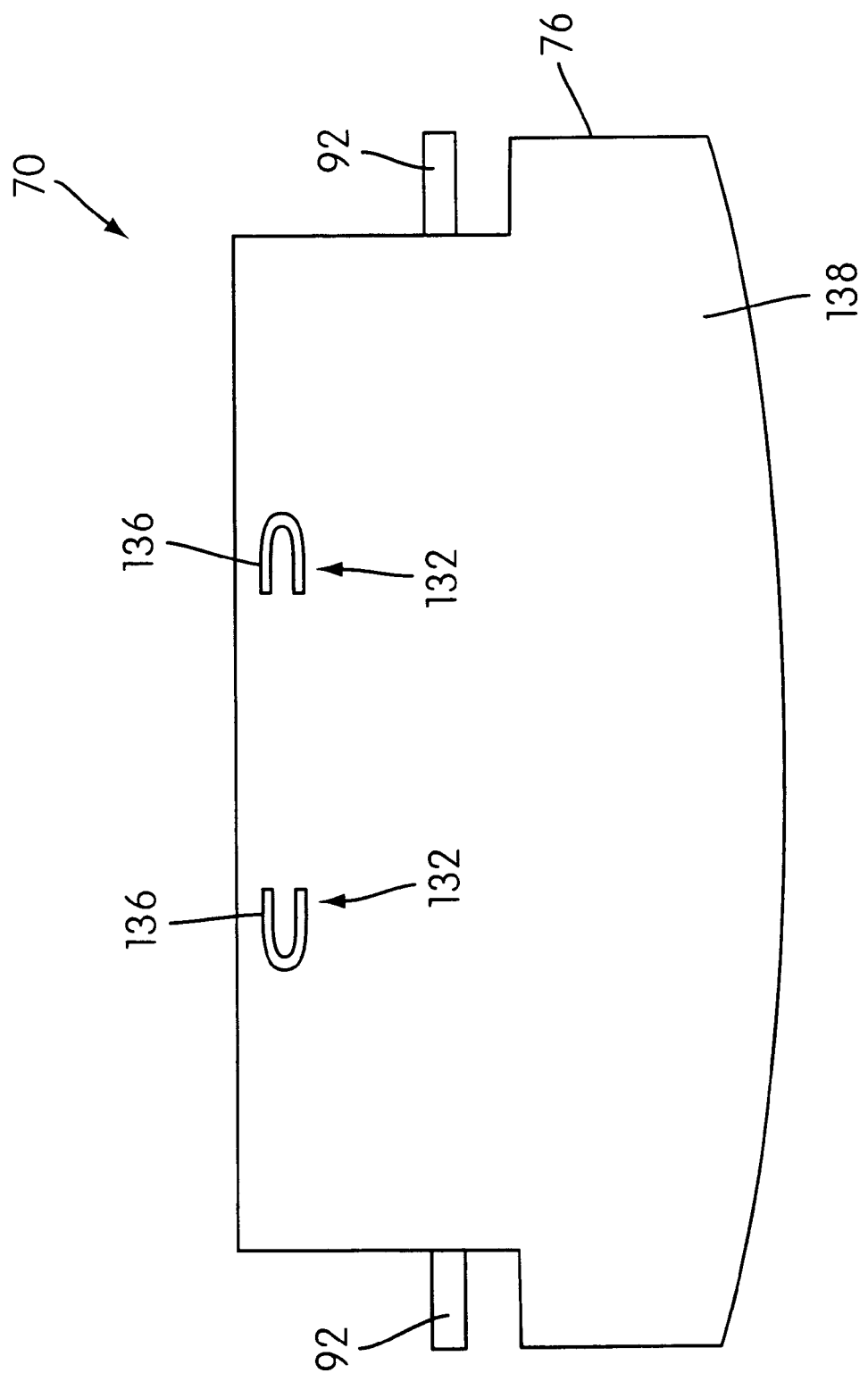
FIG. 9 is a bottom view of the cutter assembly.

The frame 12 provides a first locking structure 130 (shown in FIG. 4) and the base member 76 of the cutter assembly 70 provides a second locking structure 132 (shown in FIG. 9) such that the cutter assembly 70 is mountable to the frame 12 with the first and second locking structures 130, 132 engaging with one another to secure the cutter assembly 70 to the frame 12 in the mounted operative position.

In the illustrated embodiment, the first locking structure 130 is provided by a pair of generally U-shaped protrusions 134 formed on the frame 12 adjacent the discharge side of the master processing assembly 30. The second locking structure 132 is provided by a pair of U-shaped recesses 136 formed on a bottom surface 138 of the base member 76. However, the protrusions 134 and recesses 136 may be of any construction that cooperate to secure the cutter assembly 70 to the frame 12.

To mount the cutter assembly 70 in its mounted operative position to the frame 12, the cutter assembly 70 is moved into the discharge opening 16 of the frame 12 such that a side of the base member 76 is slidably engaged with a track portion 140 of the frame 12. The track portion 140 guides the side of the base member 76 and hence the cutter assembly 70 as the cutter assembly 70 is moved inwardly into the discharge opening 16. As the cutter assembly 70 reaches an operative position as shown in FIGS. 1 and 3, the U-shaped recesses 136 of the base member 76 engage the U-shaped protrusions 134 of the frame 12 with a snap-action to secure the base member 76 and hence the cutter assembly 70 to the frame 12. Specifically, the U-shaped protrusions 134 are resiliently deflected downwardly by the base member 76 until the cutter assembly 70 reaches an operative position. In the operative position, the U-shaped protrusions 134 move by virtue of the resiliency thereof upwardly into the U-shaped recesses 136 of the base member 76 to lock and retain the cutter assembly 70 in the operative position.

As the cutter assembly 70 is moved into the mounted operative position, each projection 92 is slidably received and guided within a blade guide track 142 formed in respective wall portions 144, 146 of the frame 12. When the cutter assembly 70 reaches the operative position, the projections 92 are received within arcuate portions 148 of the blade guide track 142. The arcuate portions 148 are configured and positioned to guide the projections 92 and hence guide the pivotal movement of the guide member 78 between non-cutting and cutting positions.

Each projection 92 is biasingly engaged by a biasing structure in the form of a spring when the cutter assembly 70 is removably mounted to the frame 12. The spring is mounted within the frame 12 and biases the projections 92 upwardly to the upper ends of the arcuate portions 148 of their respective blade guide tracks 142, thereby biasing the guide member 78 upwardly into its non-cutting position so that the blade 72 is spaced above the final product emerging from the discharge opening 16. This upward biasing of the guide member 78 assures that the final product is not accidentally cut or scratched by an operator's inadvertent lateral movement of the blade 72 and the blade carriage 82 during a master processing operation. The upward biasing of the guide member 78 to the upper ends of the blade guide track 142 also tends to prevent movement of the cutter assembly 70 outwardly from the discharge opening 16. The spring may be mounted within the cutter assembly 70 so that the guide member 78 is biased upwardly regardless of whether the cutter assembly 70 is removably mounted to the frame 12.

Because the guide member 78 is pivotally mounted to the base member 76, the blade 72 travels along a generally arcuate path with the blade guide track 142 between its non-cutting and cutting positions. The blade 72 is positioned immediately adjacent the discharge side of the master processing assembly 30 when it is in its cutting position and the guide member 78 is movably mounted to the base member 76 such that the blade 72 moves both toward the master processing assembly 30 and downwardly as the guide member 78 is moved from its non-cutting position to its cutting position. It can be appreciated from FIGS. 1 and 3 that when the cutter assembly 70 is mounted to the frame 12 and the guide member 78 is in its non-cutting position, the guide member 78 and the blade carriage 82 are disposed such that the blade 72 is angled into the discharge opening 16. This prevents the operator from accidentally being cut through contact with the blade 72.

The guide member 78 and the blade carriage 82 are each of one piece, molded plastic construction and each is molded to allow the two pieces to be snap-fit or slidably mounted to one another for sliding movement of the blade carriage 82 with respect to the guide member 78. Specifically, as best appreciated from FIGS. 7 and 8, a outer wall portion 150 of the blade carriage 82 hookingly engages an outer edge portion 152 of the guide member 78 and an inner wall portion 154 of the blade carriage 82 hookingly engages an inner edge portion 156 of the guide member 78. This construction allows the blade carriage 82 to be fit onto the guide member 78 and allows easy sliding movement therealong. This engagement between the blade carriage 82 and the guide member 78 keeps the blade 72 properly aligned relative to the final product during a cutting operation so that its cutting edge is directed transversely (i.e., perpendicularly) to the longitudinal extent of the final product being cut.

Figure 5:
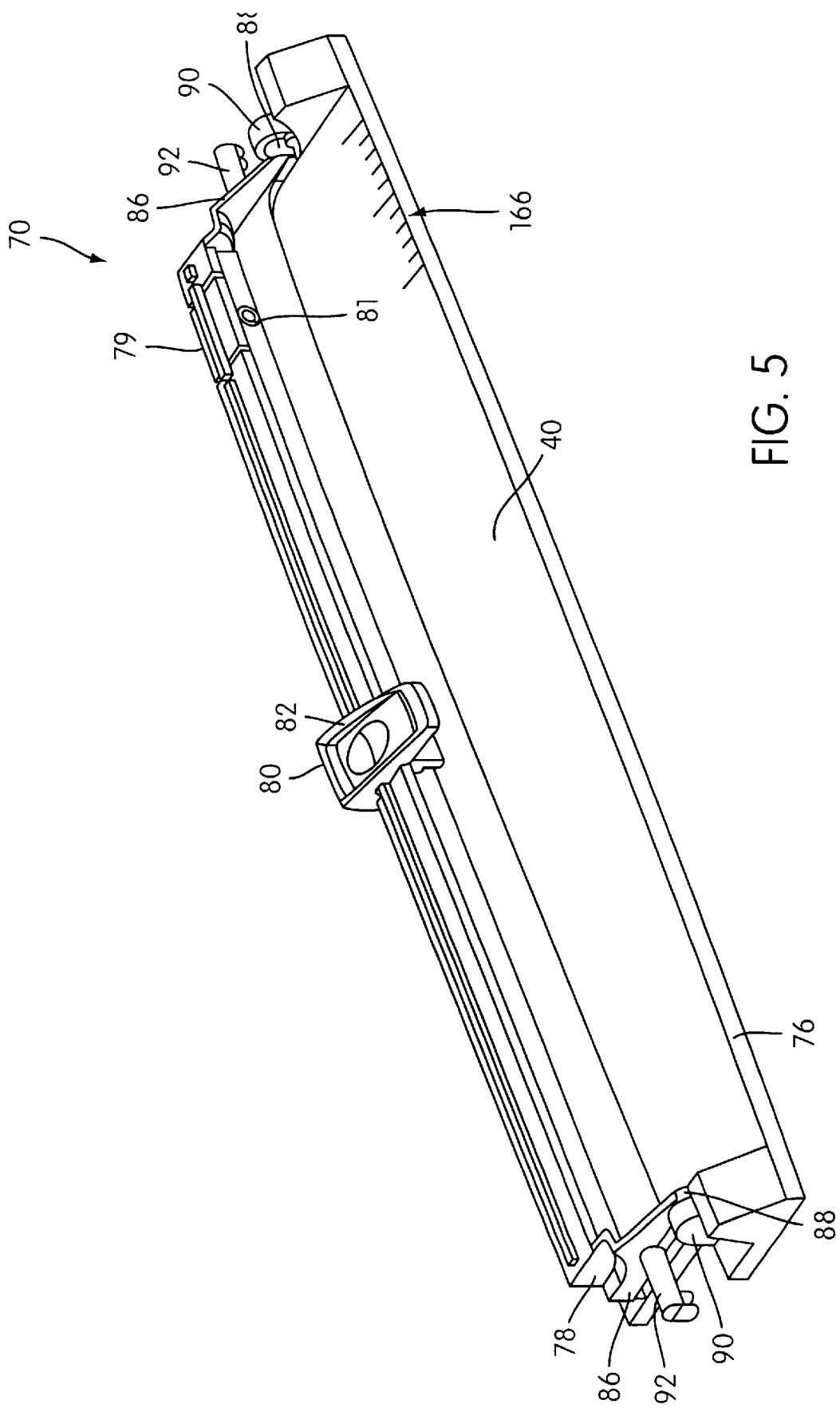
FIG. 5 is a perspective view of the cutter assembly.

Referring now more particularly to FIG. 5, the guide member 78 includes a removable guide portion 79 to facilitate the installation/removal of the blade carriage 82. In the illustrated embodiment, the removable guide portion 79 is removably mounted to the guide member 78 and secured thereto by a fastener, such as a screw 81. However, the guide portion 79 may be removably mounted to the guide member 78 with a snap fit. The guide portion 79 has the same general cross-sectional configuration as the rest of the guide member 78 so as to allow easy sliding movement of the blade carriage 82 therealong, that is, when installed in its operative position, the removable guide portion 79 is continuous with the remainder of the guide member 78 so that the blade carriage 82 can slide along the entire length of the guide member 78. The guide portion 79 is provided so that, when removed from the guide member 78, the blade carriage 82 can be disposed within the open space created by removal of the removable guide portion 79 and then can be easily slidably mounted to the guide member 78 with the outer and inner wall portions 150, 154 of the blade carriage 82 hookingly engaging the outer and inner edge portions 152, 156, respectively, of the guide member 78. Also, the blade carriage 82 can be easily removed by sliding into the open space created by removing the removable guide portion 79.

Operation of the cutter assembly 70 will now be described in greater detail. After a master processing operation, when the entire length of the master 22 has been covered with stock material 21, 23, the final product passes through the discharge opening 16. When the master 22 has cleared the discharge opening 16, the operator stops rotation of the crank handle 36 and uses the blade 82 of the cutter assembly 70 to sever the finished product from the continuous strip of stock materials 21, 23. To cut the laminated master 22 from the sheets of stock material 21, 23, preferably the operator slides the blade carriage 82 to one end of the guide member 78 and then applies a downward pressure on the blade carriage 82 sufficient to cause the blade 72 to penetrate the adhered layers of stock material 21, 23 behind the laminated master 22. The operator then slides the blade carriage 82 to the opposite end of the guide member 78 while simultaneously applying sufficient downward pressure to the blade carriage 78 to pinch the guide member 78 against the portion of the adhered stock materials 21, 23 that are being severed. The guide member 78 is provided with a pair of holding structures 158, 160 which press portions of the adhered stock materials 21, 23 against the support surface 40 to facilitate the cutting action of the blade 72.

It can be appreciated from FIG. 3 that the cutter assembly 70 is arranged to position the blade 72 close to the nip rollers 32, 34. This allows the operator to sever the stock materials 21, 23 very near the nip rollers 32, 34, which reduces the amount of waste of stock materials 21, 23. It can also be appreciated from FIG. 3 that the cutter assembly 70 is constructed to position and angle the cutting blade 72 away from the discharge opening 16 so that the operator is protected from possible contact with the blade 72 while handling or operating the apparatus 10.

To remove the cutter assembly 70 from the frame 12, the guide member 78 is first moved to its cutting position so that the projections 92 are positioned in the lower ends of the arcuate portions 148 of their respective blade guide tracks 142. Then, the cutter assembly 70 is moved with sufficient force outwardly from the discharge opening 16 to disengage the first and second locking structures 130, 132. The cutter assembly 70 is guided by the track portion 140 and guide tracks 142 outwardly from the frame 12 until the cutter assembly 70 is completely removed from the frame 12. When removed, the cutter assembly 70 is positioned in its removed operative position on the horizontal support surface 74 to perform additional cutting operations.

For example, the operator may remove the cutter assembly 70 from the frame 12 after a master processing operation to perform a trimming operation wherein the blade 72 is moved in the feeding direction to trim a processed master 22 to a desired shape or size. Once trimming is complete, the cutter assembly 70 may be removably mounted back into the frame 12 to perform severing operations after a master processing operation.

The operator may also perform cutting operations before a master processing operation. The user would simply remove the cutter assembly 70 from the frame 12, perform the desired cutting operations on the master 22, and then removably mount the cutter assembly 70 back into the frame 12 to act as the cutter after a master processing operation.

Figure 4:
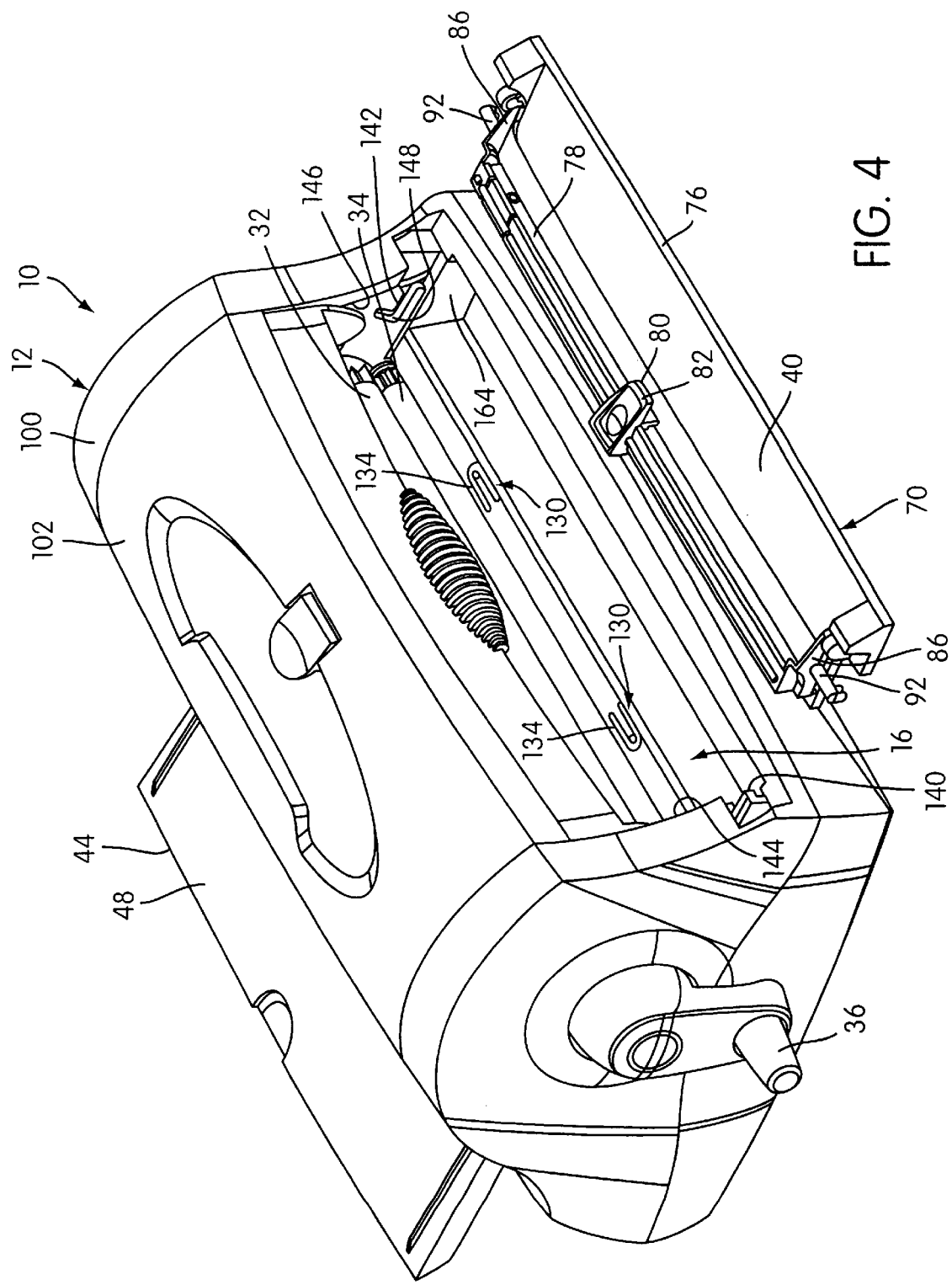
FIG. 4 is a perspective view of the master processing apparatus of FIG. 1 with the cutter assembly removed from the frame.

As shown in FIGS. 3 and 4, the frame 12 includes a storage compartment 164 on the discharge side of the master processing assembly. The storage compartment 164 has an upwardly facing opening and is configured to store objects therein. The base member 76 of the cutter assembly 70 is positioned in covering relation to the upwardly facing opening of the storage compartment 164 when the base member 76 is removably mounted in the mounted operative position to the frame 12. The cutter assembly 70 and base member 76 thereof is constructed and arranged to be removed from the frame 12 to enable access to the storage compartment 164 of the frame 12 through the upwardly facing opening thereof. The storage compartment 164 may be used to store supplies or tools for the master processing apparatus 10, such as replacement blades for the cutter assembly 70. A similar storage compartment may be provided on the feed side of the master processing assembly.

The base member 76 may include measurement indicia 166 on the substrate supporting surface 40 to enable the user to perform accurate cutting operations, as shown in FIG. 5. The base member 76 may also include an anti-slip material on the bottom surface thereof to inhibit relative movement between the base member 76 and the horizontal support surface 74 during cutting operations when the cutter assembly 70 is removed from the frame 12.

In another embodiment of the cutter assembly, the base member 76 is provided with pull-tabs 170 at edges thereof (shown in FIG. 10) to facilitate the mounting and removing of the cutter assembly 70 to the frame 12. Specifically, the pull-tabs 170 are configured and positioned such that the pull-tabs 170 may be easily grasped by the operator to pull the cutter assembly 70 from the frame 12 or to push the cutter assembly 70 into the frame 12.

Figure 10:
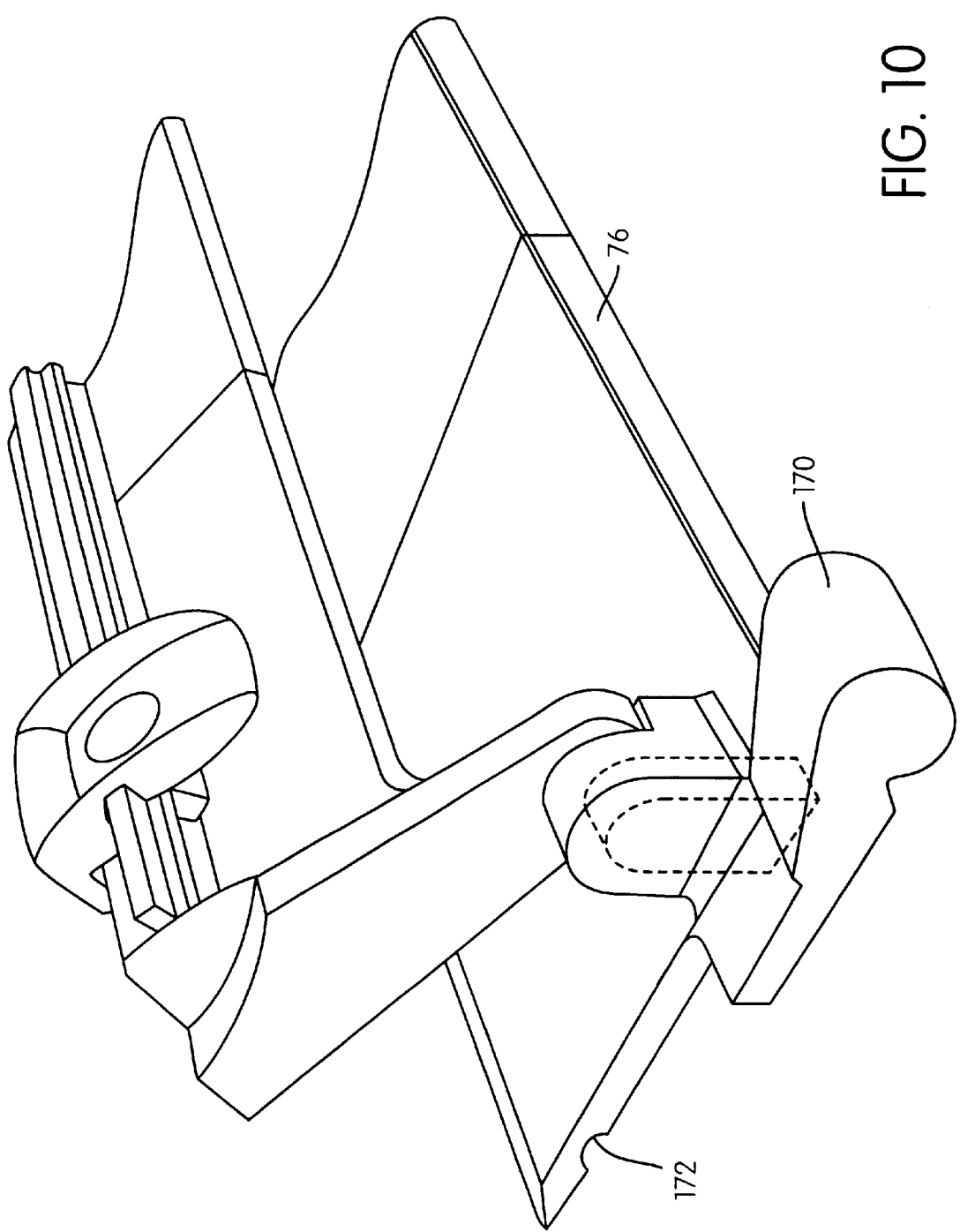
FIG. 10 is a perspective view of another embodiment of the cutter assembly.

In yet another embodiment of the cutter assembly, the base member 76 is provided with arcuate recesses 172 on the bottom surface thereof (shown in FIG. 10). When mounting the cutter assembly to the frame 12, the base member 76 is slidably received and guided within a guide track 174 formed in respective wall portions of the frame 12 (shown in FIG. 11). The cutter assembly is moved to an operative position with the recesses 172 engaging arcuate protrusions 176 (i.e., detents) provided in the guide track 174 with a snap-action to secure the base member 76 and hence the cutter assembly 70 to the frame 12.

Figure 11:
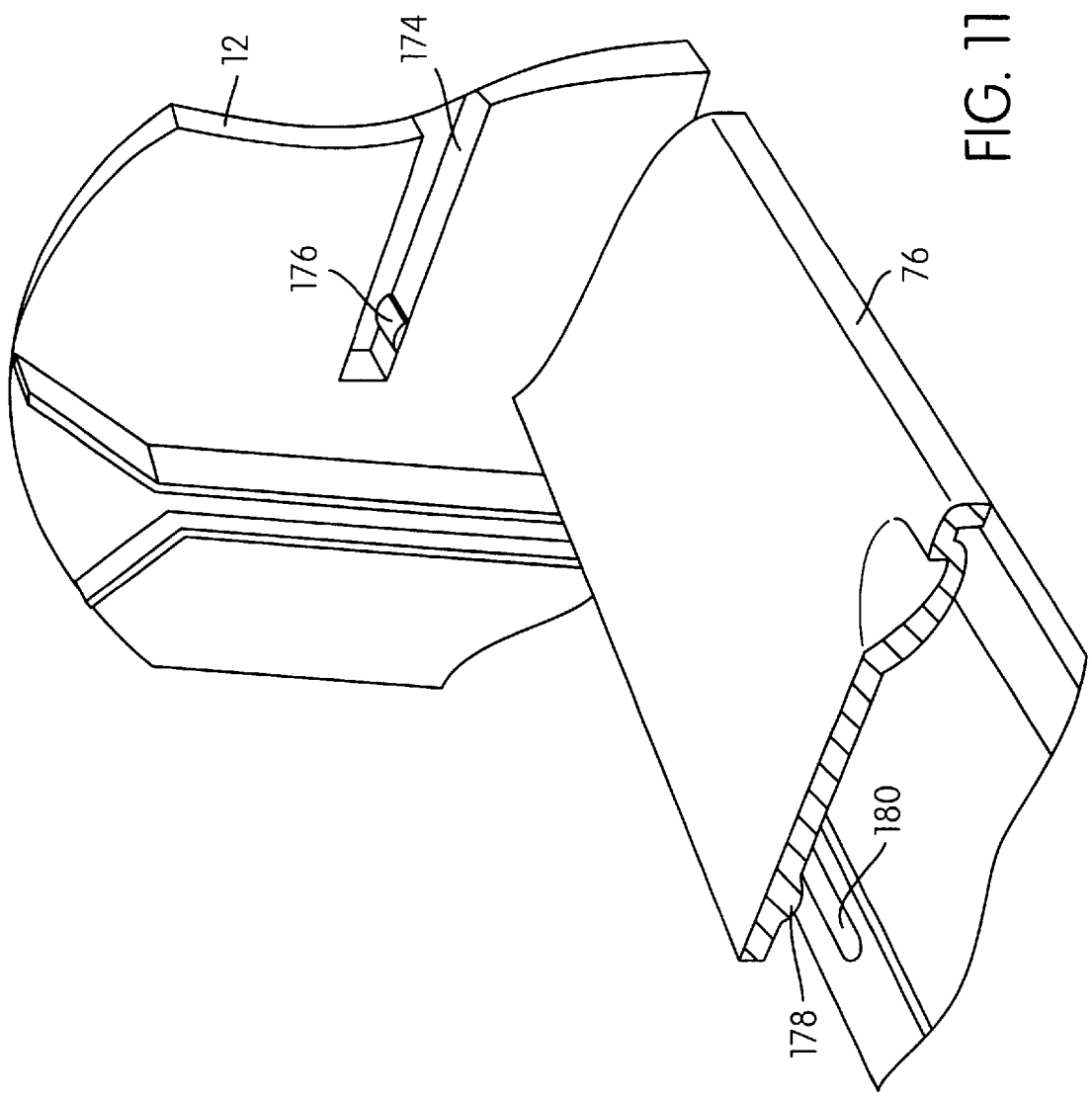
FIG. 11 is a perspective view of another embodiment of the master processing apparatus and the cutter assembly thereof.

As shown in FIG. 11, the base member 76 may include an additional protrusion 178 on the bottom surface thereof that engages a recess 180 provided in the frame 12 with a snap-action to secure the cutter assembly to the frame 12.

Figure 12:
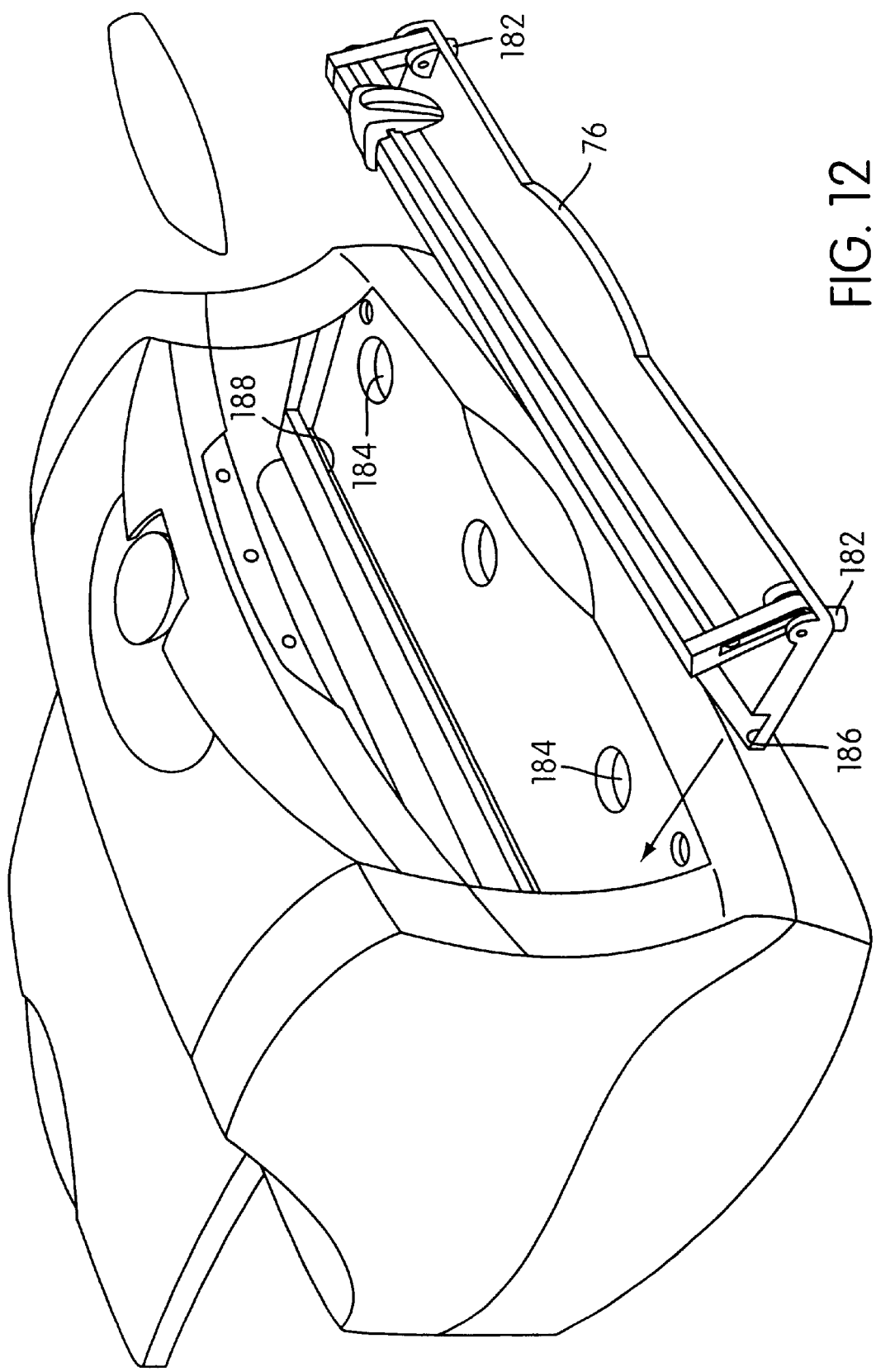
FIG. 12 is a perspective view of yet another embodiment of the master processing apparatus and the cutter assembly thereof.

In yet another embodiment of the cutter assembly shown in FIG. 12, the base member 76 may include a plurality of support surface engaging elements 182. The engaging elements 182 are configured and positioned to (a) engage the support surface 74 to stably support the cutter assembly when the cutter assembly is removed from the frame 12 and positioned on the support surface 74 and (b) locate the cutter assembly in the frame 12 when the cutter assembly is mounted to the frame 12. More specifically, when mounting the cutter assembly to the frame 12, the engaging elements 182 are received in cavities 184 of the frame 12 and a recessed portion 186 of the base member 76 is received in a slot 188 of the frame 12.

Figure 13:
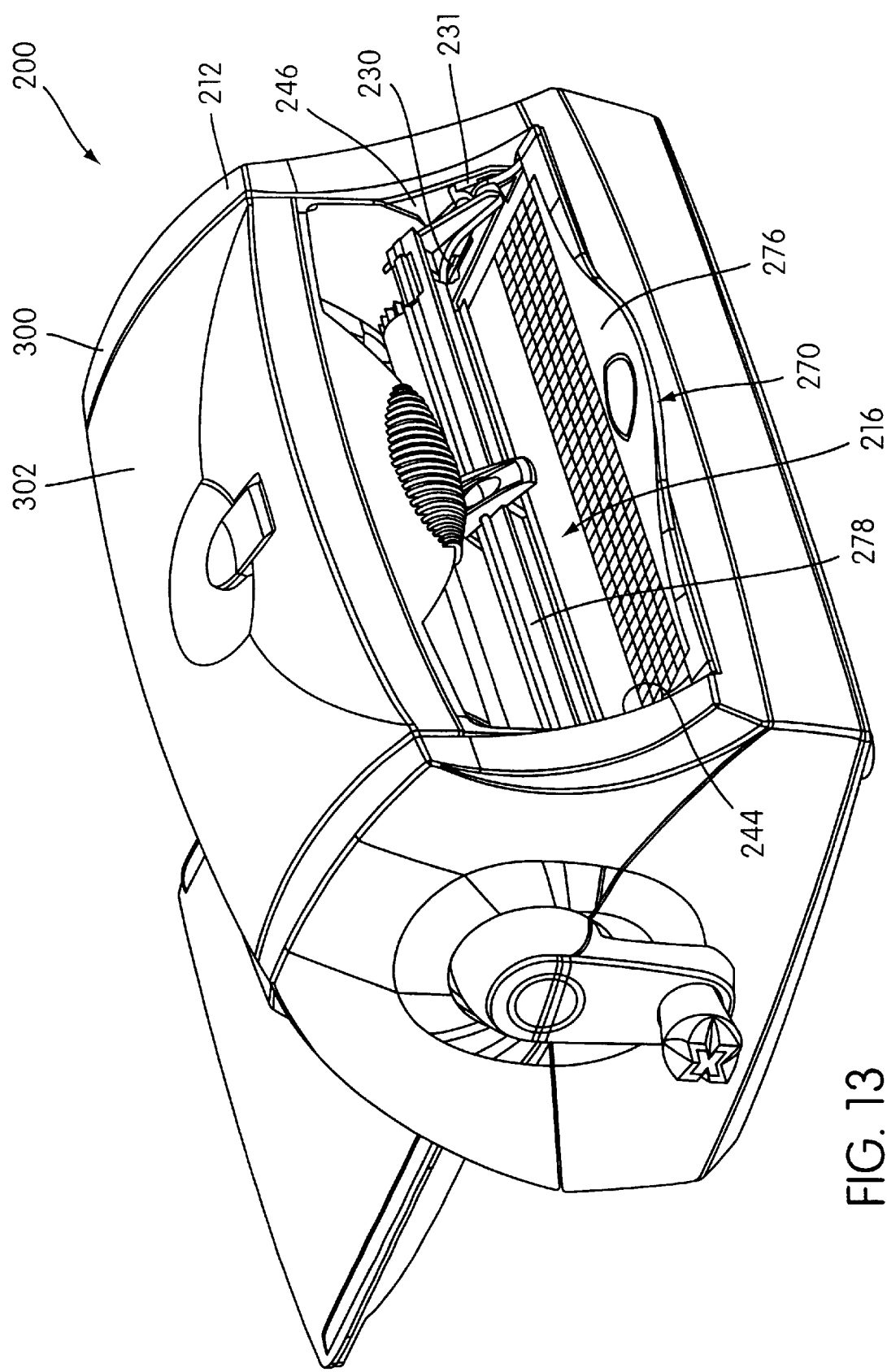
FIG. 13 is a perspective view of yet another embodiment of the master processing apparatus with a cutter assembly removably mounted to the frame thereof.
Figure 14:
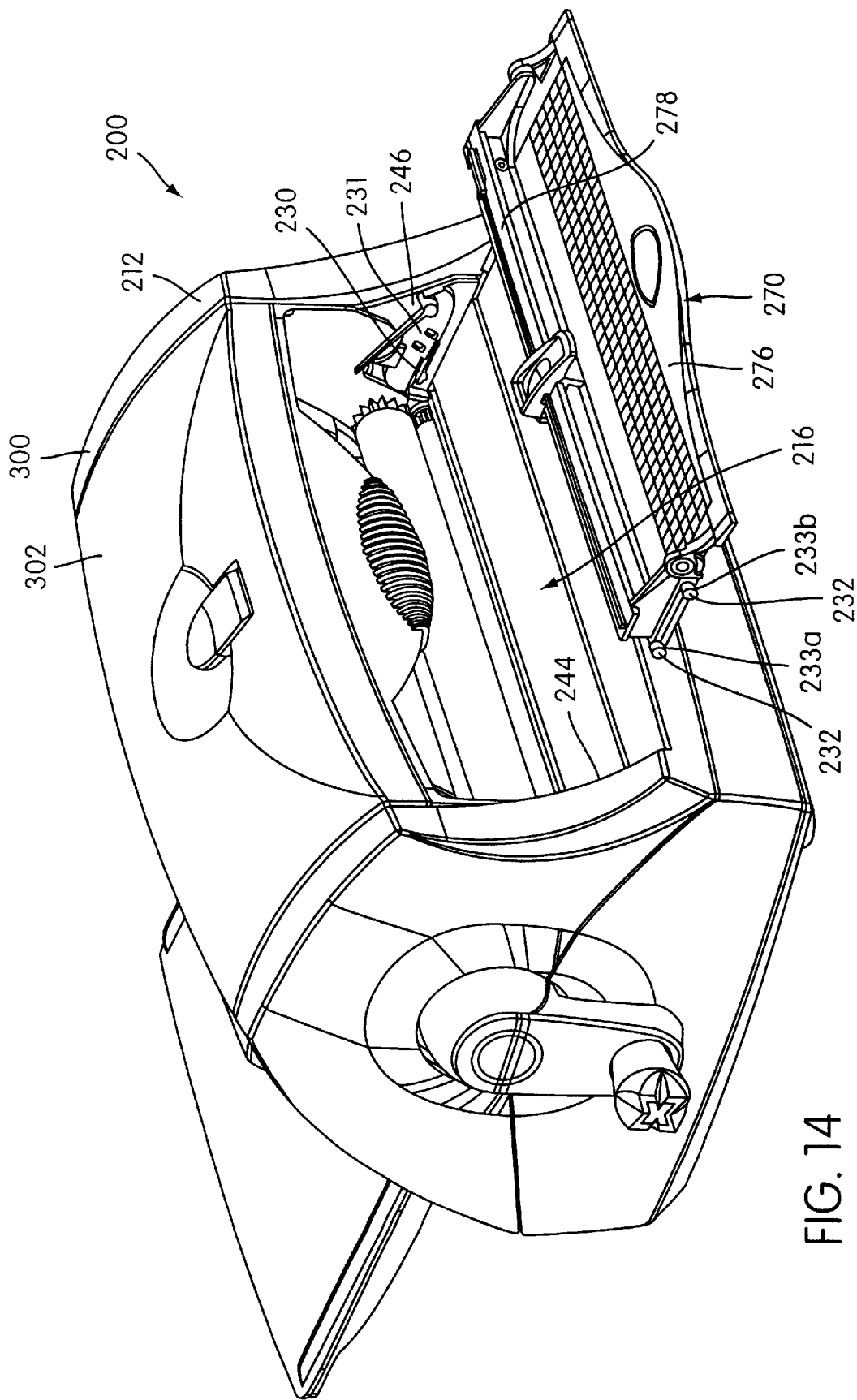
FIG. 14 is a perspective view of the master processing apparatus of FIG. 13 with the cutter assembly removed from the frame.
Figure 15:
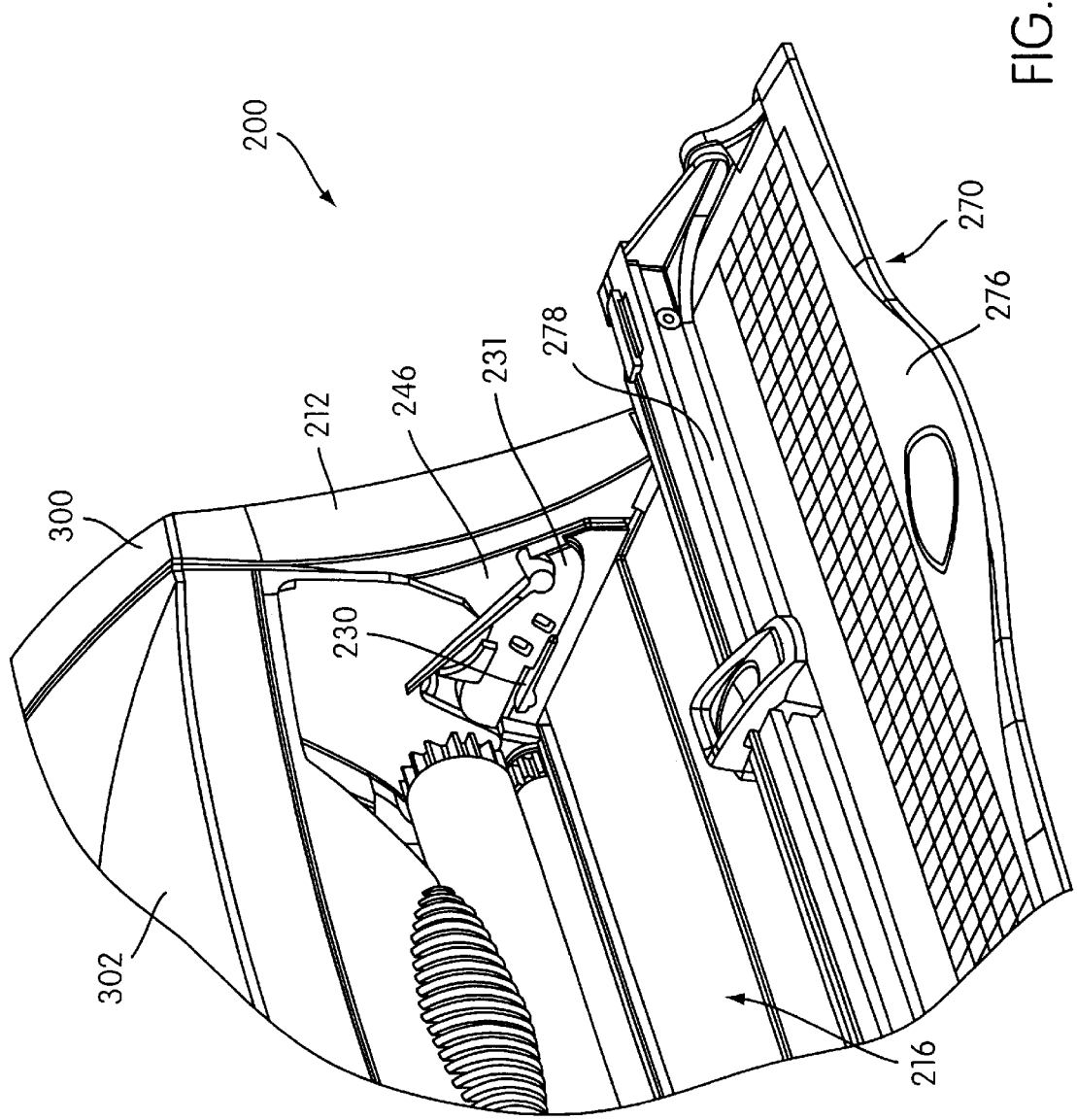
FIG. 15 is an enlarged perspective view of the master processing apparatus of FIG. 13 with the cutter assembly removed from the frame.
Figure 16:
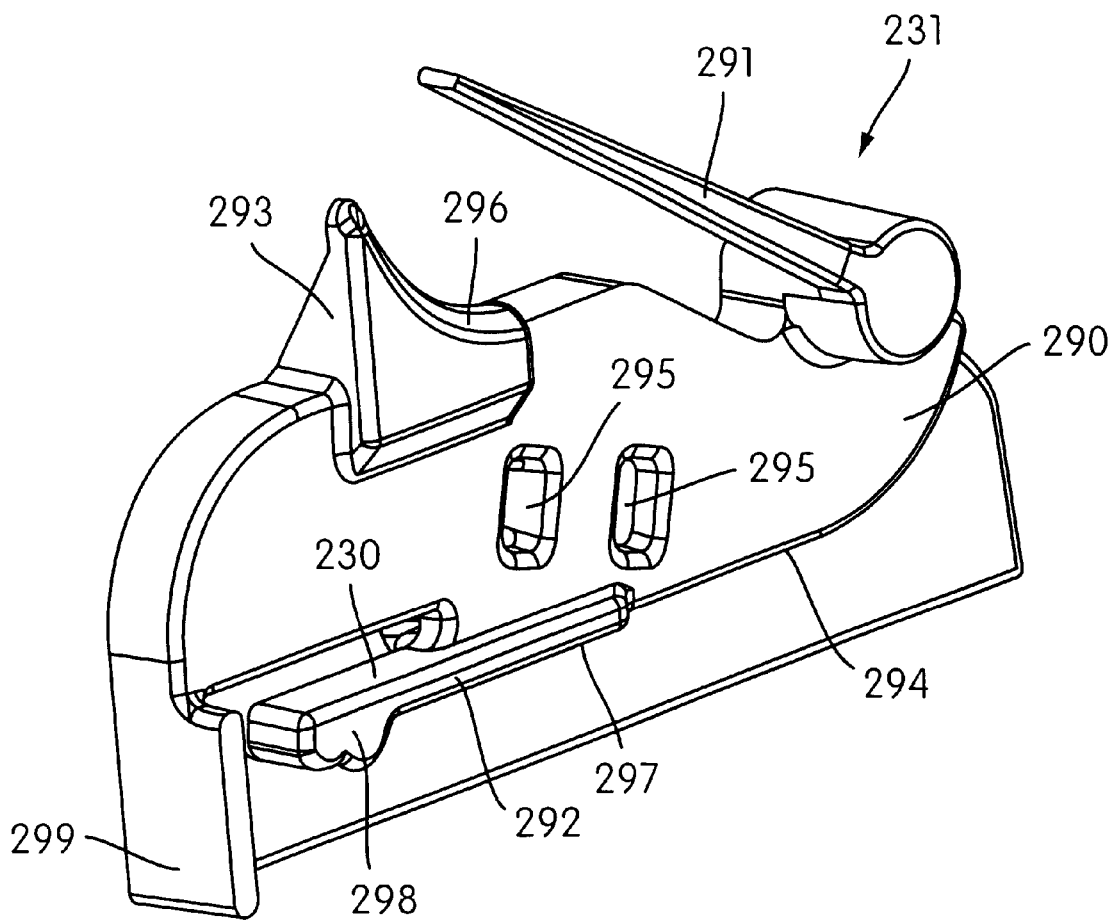
FIG. 16 is a perspective view of a retaining clip of the master processing apparatus of FIG. 13 that is structured to retain the removable cutter assembly to the frame.

FIGS. 13–16 illustrate another embodiment of the master processing apparatus, indicated as 200, that includes a cutter assembly 270 removably mounted to the frame 212. In this embodiment, the frame 212 includes a pair a retaining members 231 (only one retaining member 231 being visible) that are structured to retain the cutter assembly 270 to the frame 212. Specifically, the retaining members 231 provide a first locking structure 230 (as shown in FIGS. 14–16) and the base member 276 of the cutter assembly 270 includes a pair of post members 233a, 233b on opposing sides thereof that provide a second locking structure 232 (only one side of the cutter assembly 270 being visible in FIG. 14). The cutter assembly 270 is mountable to the frame 212 with the first and second locking structures 230, 232 engaging with one another to secure the cutter assembly 270 to the frame 212 in the mounted operative position, as will be further discussed below.

As illustrated in FIG. 16, the retaining member 231 includes a body 290, a biasing structure 291, a resilient locking arm 292, and a guiding portion 293. In the illustrated embodiment, the body 290 is integrally formed with the biasing structure 291, the resilient locking arm 292, and the guiding portion 293. However, the body 290 may be formed separately from these parts and fixedly mounted together in any known manner.

The body 290 includes a guiding surface 294 configured to guide a respective end of the cutter assembly 270 into the mounted operative position. The body 290 also includes a pair of protrusions 295 that engage within cooperating recesses provided in the side wall portions 244, 246 of the frame 212 so as to securely retain the respective retaining member 231 to the frame 212, as shown in FIG. 14. Heat-staking, fasteners, snap-fitting, adhesive, or any other suitable fastening may be used to secure the retaining members 231 to the frame 212.

The biasing structure 291 is in the form of a spring and biases the guide member 278 of the cutter assembly 270 upwardly into its non-cutting position when the cutter assembly 270 is in the mounted operative position, as shown in FIG. 13.

The guiding portion 293 is positioned adjacent the free end of the biasing structure 291 and prevents engagement between the biasing structure 291 and respective side wall portions 244, 246 of the frame 212 as the biasing structure 291 is pivoted downwardly during pivoting movement of the guide member 278 during a cutting operation. Specifically, the free end of the biasing structure 291 engages the guiding portion 293 as the biasing structure 291 is moved downwardly against the bias thereof during a cutting operation. The guiding portion 293 includes a guiding surface 296 that is suitably contoured to guide the biasing structure 291 away from the respective side wall portions 244, 246 of the frame 212 so that the biasing structure 291 does not become wedged between the first and second frame portions 300, 302 of the frame 212 which can adversely affect operation of the cutter assembly. As described in a previous embodiment, the first and second frame portions 300, 302 of the frame 212 are movably connected for movement relative to one another between closed and open positions to facilitate the replacement of feed rolls.

In the illustrated embodiment, the biasing structure 291 and the guiding portion 293 are provided on only one of the retaining members 231. However, it is contemplated that both retaining members 231 may include the biasing structure 291 and the guiding portion 293.

The resilient locking arm 292 includes a guiding surface 297 that is continuous with the guiding surface 294 of the body 290. The locking arm 292 also includes a free end having a protrusion 298 thereon. The protrusion 298 is configured to retain the cutter assembly 270 in the mounted operative position, as will be further discussed.

To mount the cutter assembly 270 in its mounted operative position to the frame 212, the cutter assembly 270 is moved into the discharge opening 216 of the frame 212 such that the post members 233a, 233b of the base member 276 are slidably engaged with respective guiding surfaces 294 provided by the retaining members 231. The guiding surfaces 294 guide the base member 276 and hence the cutter assembly 270 as the cutter assembly 270 is moved inwardly into the discharge opening 216. As the cutter assembly 270 is moved further inwardly into the discharge opening 216, the forward post member 233a moves from the guiding surfaces 294 to the guiding surfaces 297 of the resilient locking arm 292. As the cutter assembly 270 reaches an operative position as shown in FIG. 13, the forward post members 233a of the base member 276 engage the protrusions 298 of the locking arms 292 with a snap-action to secure the base member 276 and hence the cutter assembly 270 to the frame 212. Specifically, the protrusions 298 are resiliently deflected upwardly by the forward post members 233a of the base member 276 until the cutter assembly 270 reaches an operative position. In the operative position, the protrusions 298 move by virtue of the resiliency thereof downwardly to lock and retain the cutter assembly 270 in the operative position. In the operative position, the forward post members 233a are positioned between the protrusions 298 and a rear wall 299 of the retaining members 231 (see FIG. 16).

As the cutter assembly 270 is moved into the mounted operative position, a least one of the ends of the guide member 278 of the cutter assembly 270 is positioned into engagement with a biasing structure 291 provided on at least one of the retaining members 231. The biasing structure 291 biases the guide member 278 upwardly into its non-cutting position so that the blade thereof is spaced above the final product emerging from the discharge opening 216.

To remove the cutter assembly 270 from the frame 212, the cutter assembly 270 is moved with sufficient force outwardly from the discharge opening 216 to disengage the forward post members 233a from its position between the protrusions 298 and the rear wall 299 of the retaining members 231. The cutter assembly 270 is guided by the guiding surfaces 297, 294 outwardly from the frame 212 until the cutter assembly 270 is completely removed from the frame 212, as shown in FIG. 14. When removed, the cutter assembly 270 may be positioned in its removed operative position on a horizontal support surface to perform additional cutting operations.

The base member 76 may include a grid pattern on the substrate supporting surface 40 to enable the user to perform accurately aligned cutting operations, as best shown in FIG. 15. The grid pattern may include indicia for measuring purposes.

It can thus be appreciated that the objectives of the present invention have been fully and effectively accomplished. The foregoing specific embodiments have been provided to illustrate the structural and functional principles of the present invention and are not intended to be limiting. To the contrary, the present invention is intended to encompass all modifications, alterations, and substitutions within the spirit and scope of the appended claims.

What is claimed is:

1. A master processing apparatus for use with a pair of removable feed rolls, the removable feed rolls carrying a supply of stock material to be unwound, at least one of the stock materials having a layer of adhesive provided thereon, the apparatus comprising:

a frame constructed and arranged to removably mount the feed rolls;

a master processing assembly constructed and arranged such that, when the feed rolls are removably mounted to the frame, a master can be inserted into the master processing assembly together with the stock materials unwound from their respective feed rolls and disposed on opposing sides of the master;

the master processing assembly being constructed and arranged to perform a master processing operation wherein the master processing assembly causes adhesive bonding between the master and the stock materials being fed in a feeding direction into the feed side thereof and subsequently discharges the processed master and stock materials outwardly from a discharge side thereof; and a cutter assembly removably mounted in a mounted operative position to the frame on the discharge side of the master processing assembly, the cutter assembly having (a) a base member removably mountable to the frame and extending generally transversely with respect to the frame, the base member providing a substrate supporting surface configured to receive and support the processed master and stock materials being discharged from the processing assembly in a substantially flat relation, and (b) a blade mounted to the base member and movable to perform a cutting operation in the form of a severing operation wherein the blade cuts through the stock materials discharged from the processing assembly and supported on the base member in a direction generally transverse to the feeding direction to sever a final product comprising the processed master and stock materials from a remainder of the supply of the stock materials;

the cutter assembly being constructed and arranged to be removed from the frame as a unit for placement in a removed operative position on a generally horizontal surface separate from the frame, the cutter assembly being constructed and arranged such that, in the removed operative position, the blade is movable to perform other cutting operations including a trimming operation wherein the blade is moved to cut through the processed stock materials supported on the base member in the feeding direction.

2. A master processing apparatus according to claim 1, wherein the cutter assembly further comprises:

a guide member movably mounted to the base member, wherein the blade is slidably mounted on the guide member for guided cutting movement therealong.

3. A master processing apparatus according to claim 2, wherein the guide member is movably mounted to the base member for selective manual movement between (a) a non-cutting position wherein the blade is positioned in spaced relation above the substrate supporting surface to prevent the blade assembly from cutting through the processed master and stock materials and (b) a cutting position wherein the blade is positioned such that a blade portion thereof extends downwardly below the substrate supporting surface so that the downward extent of the blade portion enables the blade to cut through an entire thickness of the processed master and stock materials during the cutting movement.

4. A master processing apparatus according to claim 3, further comprising a biasing structure to bias the guide member to the non-cutting position thereof.

5. A master processing apparatus according to claim 3, wherein the guide member is movably mounted such that the blade travels along a generally arcuate path between the non-cutting and cutting positions.

6. A master processing apparatus according to claim 3, wherein when the cutter assembly is mounted to the frame in the mounted operative position thereof, the blade is positioned immediately adjacent the discharge side of the master processing assembly when in the cutting position thereof and wherein the guide member is movably mounted to the base member such that the blade mounted thereto moves both toward the master processing assembly and downwardly as the guide member is moved from the non-cutting position to the cutting position.

7. A master processing apparatus according to claim 3, wherein the guide member has a pair of mounting arms extending from opposing ends whereof, the mounting arms being pivotally connected to the base member to movably mount the guide member.

8. A master processing apparatus according to claim 3, wherein the base member provides a blade receiving slot, the blade portion of the blade extending into the blade receiving slot in the operative position such that the blade portion extends downwardly below the substrate supporting surface.

9. A master processing apparatus according to claim 1, wherein the frame provides a first locking structure, the base member of the cutter assembly providing a second locking structure and being mountable to the frame with the first and second locking structures engaging with one another to secure the cutter assembly on the frame in the mounted operative position thereof.

10. A master processing apparatus according to claim 1, wherein the base member engages the generally horizontal surface in the removed operative position of the cutter assembly.

11. A master processing apparatus according to claim 10, wherein the base member includes a plurality of support surface engaging elements, the engaging elements being configured and positioned to (a) engage the support surface to stably support the cutter assembly when the cutter assembly is removed from the frame and positioned on the support surface in the removed operative position and (b) locate the cutter assembly in the frame when the cutter assembly is mounted to the frame in the mounted operative position.

12. A master processing apparatus according to claim 1, wherein the base member includes measurement indicia on the substrate supporting surface.

13. A master processing system comprising:

a frame;

first and second feed rolls carrying respective supplies of first and second stock material, the feed rolls being mounted to the frame to enable the stock materials to be unwound from their respective feed rolls, at least one of the stock materials having a layer of adhesive disposed thereon;

a master processing assembly constructed and arranged such that a master can be inserted into the master processing assembly together with the stock materials unwound from their respective feed rolls and disposed on opposing sides of the master;

the master processing assembly being constructed and arranged to perform a master processing operation wherein the master processing assembly causes adhesive bonding between the master and the stock materials being fed into the feed side thereof and subsequently discharges the processed master and stock materials outwardly from a discharge side thereof; and a cutter assembly removably mounted in a mounted operative position to the frame on the discharge side of the master processing assembly, the cutter assembly having (a) a base member removably mountable to the frame and extending generally transversely with respect to the frame, the base member providing a substrate supporting surface configured to receive and support the processed master and stock materials being discharged from the processing assembly in a substantially flat relation, and (b) a blade mounted to the base member and movable to perform a cutting operation in the form of a severing operation wherein the blade cuts through the stock materials discharged from the processing assembly and supported on the base member in a direction generally transverse to the feeding direction to sever a final product comprising the processed master and stock materials from a remainder of the supply of the stock materials;

the cutter assembly being constructed and arranged to be removed from the frame as a unit for placement in a removed operative position on a generally horizontal surface separate from the fame, the cutter assembly being constructed and arranged such that, in the removed operative position, the blade is movable to perform other cutting operations including a trimming operation wherein the blade is moved to cut through the processed stock materials supported on the base member in the feeding direction.

14. A master processing system according to claim 13, wherein the master processing assembly comprises a pair of cooperating nip rollers constructed and arranged to apply pressure to the master and the stock materials during the master processing operation.

15. A master processing system according to claim 13, further comprising an actuator constructed and arranged to affect operation of the master processing assembly.

16. A master processing system according to claim 13, further comprising a cartridge including a cartridge body structure, the feed rolls being mounted to the cartridge body structure and the cartridge body structure being removably mounted to the frame.

17. A master processing system according to claim 13, wherein the cutter assembly further comprises:

a guide member movably mounted to the base member, wherein the blade is slidably mounted on guide member for guided cutting movement therealong.

18. A master processing system according to claim 17, wherein the guide member is movably mounted to the base member for selective manual movement between (a) a non-cutting position wherein the blade is positioned in spaced relation above the substrate supporting surface to prevent the blade assembly from cutting through the processed master and stock materials and (b) a cutting position wherein the blade is positioned such that a blade portion thereof extends downwardly below the substrate supporting surface so that the downward extent of the blade portion enables the blade to cut through an entire thickness of the processed master and stock materials during the cutting movement.

19. A master processing system according to claim 18, further comprising a biasing structure to bias the guide member to the non-cutting position thereof.

20. A master processing system according to claim 18, wherein the guide member is movably mounted such that the blade travels along a generally arcuate path between the non-cutting and cutting positions.

21. A master processing system according to claim 18, wherein when the cutter assembly is mounted to the frame, the blade is positioned immediately adjacent the discharge side of the master processing assembly when in the cutting position thereof and wherein the guide member is movably mounted to the base member such that the blade mounted thereto moves both toward the master processing assembly and downwardly as the guide member is moved from the non-cutting position to the cutting position.

22. A master processing system according to claim 18, wherein the guide member has a pair of mounting as extending from opposing ends thereof, the mounting arms being pivotally connected to the base member to movably mount the guide member.

23. A master processing system according to claim 18, wherein the base member provides a blade receiving slot, the blade portion of the blade extending into the blade receiving slot in the operative position such that the blade portion extends downwardly below the substrate supporting surface.

24. A master processing system according to claim 13, wherein the frame provides a first locking structure, the base member of the cutter assembly providing a second locking structure and being mountable to the frame with the first and second locking structures engaging with one another to secure the cutter assembly on the frame in the mounted operative position thereof.

25. A master processing system according to claim 13, wherein the base member engages the generally horizontal surface in the removed operative position of the cutter assembly.

26. A master processing system according to claim 25, wherein the base member includes a plurality of support surface engaging elements, the engaging elements being configured and positioned to (a) engage the support surface to stably support the cutter assembly when the cutter assembly is removed from the fame and positioned on the support surface in the removed operative position and (b) locate the cutter assembly in the frame when the cutter assembly is mounted to the frame in the mounted operative position.

27. A master processing system according to claim 13, wherein the base member includes measurement indicia on the substrate supporting surface.

28. A master processing apparatus for use with a pair of removable feed rolls, the removable feed rolls carrying a supply of stock material to be unwound, at least one of the stock materials having a layer of adhesive provided thereon, the apparatus comprising:

a frame constructed and arranged to removably mount the feed rolls;

a master processing assembly constructed and arranged such that, when the feed rolls are removably mounted to the frame, a master can be inserted into the master processing assembly together with the stock materials unwound from their respective feed rolls and disposed on opposing sides of the master;

the master processing assembly being constructed and avenged to perform a master processing operation wherein the master processing assembly causes adhesive bonding between the master and the stock materials being fed in a feeding direction into the feed side thereof and subsequently discharges the processed master and stock materials outwardly from a discharge side thereof; and a cutter assembly mounted to the frame on the discharge side of the master processing assembly, the cutter assembly having a blade movable to perform a cutting operation in the form of a severing operation wherein the blade cuts through the stock materials discharged from the processing assembly in a direction generally transverse to the feeding direction to sever a final product comprising the processed master and stock materials from a remainder of the supply of the stock materials;

the cutter assembly including a generally transversely extending guide member and a blade carriage carrying the blade, the blade carriage being mounted on the guide member to enable the blade and the carriage to be moved generally transversely therealong to perform the severing operation;

the guide member having a removable portion that is removable to create an open space in the guide member, the open space being configured to enable the blade carriage to be (a) removed by transversely moving the carriage into the open space so as to disengage the carriage from the guide member and (b) installed by disposing the blade carriage within the open space and moving the blade carriage transversely onto the guide member.

29. A master processing apparatus for use with a pair of removable feed rolls, the removable feed rolls carrying a supply of stock material to be unwound, at least one of the stock materials having a layer of adhesive provided thereon, the apparatus comprising:

a frame constructed and arranged to removably mount the feed rolls;

a master processing assembly constructed and arranged such that, when the feed rolls are removably mounted to the frame, a master can be inserted into the master processing assembly together with the stock materials unwound from their respective feed rolls and disposed on opposing sides of the master;

the master processing assembly being constructed and arranged to perform a master processing operation wherein the master processing assembly causes adhesive bonding between the master and the stock materials being fed in a feeding direction into a feed side thereof and subsequently discharges the processed master and stock materials outwardly from a discharge side thereof; and a support structure removably mounted in a mounted operative position to the frame on one of the feed side and the discharge side of the master processing assembly, the support structure having a substrate supporting surface configured to receive and support the processed master and stock materials being fed through the master processing assembly in a substantially flat relation;

wherein the frame includes a storage compartment on the same side of the master processing assembly as the support structure in its mounted operative position, the storage compartment having an upwardly facing opening and being configured to store objects therein, the support structure being positioned in covering relation to the upwardly facing opening of the storage compartment when the support structure is removably mounted in the mounted operative position to the frame, the support structure being constructed and arranged to be removed from the frame to enable access to the storage compartment of the frame through the upwardly facing opening thereof.

30. A master processing apparatus according to claim 29, wherein said support structure is removably mounted in its mounted operative position on the discharge side of the master processing assembly.

31. A master processing apparatus according to claim 30, wherein the support structure is a base member for a cutter assembly, the cutter assembly having a blade movable to perform a cutting operation in the form of a severing operation wherein the blade cuts through the stock materials discharged from the processing assembly in a direction generally transverse to the feeding direction to sever a final product comprising the processed master and stock materials from a remainder of the supply of the stock materials;

the cutter assembly being constructed and arranged to be removed from the frame for placement in a removed operative position on a generally horizontal surface separate from the frame, the cutter assembly being constructed and arranged such that, in the removed operative position, the blade is movable to perform other cutting operations including a timing operation wherein the blade is moved to cut through the processed stock materials in the feeding direction.

32. A master processing apparatus according to claim 31, wherein the cutter assembly further comprises a guide member movably mounted to the base member, and wherein the blade is slidably mounted on the guide member for guided cutting movement therealong.

33. A master processing apparatus according to claim 32, wherein the guide member is movably mounted to the base member for selective manual movement between (a) a non-cutting position wherein the blade is positioned in spaced relation above the substrate supporting surface to prevent the blade assembly from cutting through the processed master and stock materials and (b) a cutting position wherein the blade is positioned such that a blade portion thereof extends downwardly below the substrate supporting surface so that the downward extent of the blade portion enables the blade to cut through an entire thickness of the processed master and stock materials during the cutting movement.

* * * * *